United States Patent
Dao

(10) Patent No.: US 12,157,587 B2
(45) Date of Patent: Dec. 3, 2024

(54) ROTARY AND FIXED WING CONVERTIBLE AIRCRAFT WITH MONOCOPTERS

(71) Applicant: Aeroseed LLC, Fallbrook, CA (US)

(72) Inventor: Ricardo Emilio Dao, San Diego, CA (US)

(73) Assignee: Aeroseed LLC, Fallbrook, CA (US)

( * ) Notice: Subject to any disclaimer, the term of this patent is extended or adjusted under 35 U.S.C. 154(b) by 0 days.

(21) Appl. No.: 18/335,045

(22) Filed: Jun. 14, 2023

(65) Prior Publication Data

US 2023/0406551 A1    Dec. 21, 2023

Related U.S. Application Data

(60) Provisional application No. 63/352,369, filed on Jun. 15, 2022.

(51) Int. Cl.
*B64U 10/20* (2023.01)
*B64C 27/16* (2006.01)
(Continued)

(52) U.S. Cl.
CPC .............. *B64U 10/20* (2023.01); *B64C 37/02* (2013.01); *B64U 20/40* (2023.01); *B64U 30/12* (2023.01);
(Continued)

(58) Field of Classification Search
CPC ......... B64C 37/02; B64C 27/16; B64C 27/24; B64U 30/291; B64U 30/297; B64U 20/40;
(Continued)

(56) References Cited

U.S. PATENT DOCUMENTS

| | | | | |
|---|---|---|---|---|
| 2,479,125 A | * | 8/1949 | Leonard | B64C 29/02 244/7 B |
| 8,366,055 B2 | * | 2/2013 | Ulrich | B64U 10/25 244/17.11 |

(Continued)

FOREIGN PATENT DOCUMENTS

| | | |
|---|---|---|
| DE | 102019128202 A1 | 4/2021 |
| JP | 2019131155 A | 8/2019 |

(Continued)

OTHER PUBLICATIONS

Win, et al., "Dynamics and Control of a Collaborative and Separating Descent of Samara Autorotating Wings," IEEE Robotics and Automation Letters, vol. 4, No. 3, Jul. 2019, pp. 3067-3074.
(Continued)

*Primary Examiner* — Richard Green
(74) *Attorney, Agent, or Firm* — Knobbe, Martens, Olson & Bear, LLP

(57) ABSTRACT

Systems, methods and devices for rotary and fixed wing convertible aircraft with monocopters. A monocopter flying device may include a main body and a wing pivotally coupled to the main body. A wing actuator operably coupled to the wing may be configured to pivot the wing about its longitudinal axis. The flying device may include a propulsion unit pivotally coupled to the main body that includes a motor and a propeller having a hub and radially extending blades. A propulsion unit actuator may be configured to pivot the propulsion unit about an axis non-parallel to the axis of rotation of the propellor. The flying device may include a control system including one or more processors configured to control operation of the devices. The flying devices may connect together to form a flying system having multiple flight modes with varying orientations. The flying system may disaggregate the flying devices in flight.

18 Claims, 17 Drawing Sheets

(51) Int. Cl.
| | |
|---|---|
| *B64C 37/02* | (2006.01) |
| *B64U 20/40* | (2023.01) |
| *B64U 30/12* | (2023.01) |
| *B64U 30/21* | (2023.01) |
| *B64U 30/297* | (2023.01) |
| *B64U 40/10* | (2023.01) |

(52) U.S. Cl.
CPC ........... *B64U 30/21* (2023.01); *B64U 30/297* (2023.01); *B64U 40/10* (2023.01); *B64C 27/16* (2013.01); *B64U 2201/102* (2023.01); *B64U 2201/20* (2023.01)

(58) Field of Classification Search
CPC ........ B64U 20/50; B64U 40/10; B64U 40/20; B64U 2201/102
See application file for complete search history.

(56) References Cited

U.S. PATENT DOCUMENTS

| | | | |
|---|---|---|---|
| 9,764,828 | B2 | 9/2017 | Ulrich et al. |
| 10,189,565 | B2* | 1/2019 | Patterson ............... B64C 37/02 |
| 10,807,708 | B2* | 10/2020 | Wright ................... B64U 10/20 |
| 11,453,492 | B2* | 9/2022 | Low ....................... B64U 30/297 |
| 2006/0121818 | A1 | 6/2006 | Lee et al. |
| 2014/0008498 | A1* | 1/2014 | Reiter .................... B64U 40/10 244/7 A |
| 2014/0312164 | A1 | 10/2014 | Gibson et al. |
| 2016/0123182 | A1 | 5/2016 | Samaritano et al. |
| 2016/0272310 | A1 | 9/2016 | Chan et al. |
| 2019/0176956 | A1 | 6/2019 | Chen |
| 2019/0382104 | A1 | 12/2019 | Low et al. |
| 2022/0194569 | A1* | 6/2022 | Georgeson ............. B64U 10/20 |

FOREIGN PATENT DOCUMENTS

| | | |
|---|---|---|
| KR | 20160031602 A | 3/2016 |
| WO | WO/2019/063169 | 4/2019 |

OTHER PUBLICATIONS

Win, et al., "Design and Control of the First Foldable Single-Actuator Rotary Wing Micro Aerial Vehicle," Bioinspiration & Biometrics, vol. 16, No. 6, Nov. 2021.

Cai, et al., "Cooperative Modular Single Actuator Monocopters Capable of Controlled Passive Separation," 2022 International Conference on Robotics and Automation (ICRA), Philadelphia, PA, USA, 2022, pp. 1989-1995.

ICRA 2022—Cooperative Modular Single Actuator Monocopters capable of Controlled Passive Separation, by AIR Lab (SUTD), YouTube [online], published on May 26, 2022, [retrieved on Jun. 14, 2023], retrieved from the internet in 1 page. https://www.youtube.com/watch?v=AbeKkcXIEdw.

T-RO 2021—An Agile Samara—Inspired Single-Actuator Aerial Robot capable of Autorotation & Diving, by AIR Lab (SUTD), YouTube [online], published on Jul. 12, 2021, [retrieved on Jun. 14, 2023], retrieved from the internet in 1 page. https://www.youtube.com/watch?v=h1UJhhoAxVw.

Design & Development of a Monocopter, by Multi-Rotor Society SUTD, YouTube [online], published on Aug. 7, 2016, [retrieved on Jun. 14, 2023], retrieved from the internet in 1 page. https://www.youtube.com/watch?v=I_6EjX8T9Ag.

Hiller YH-32 Hornet Helicopter (1951), by AIRBOYD, YouTube [online], published on Nov. 27, 2012, [retrieved on Jun. 14, 2023], retrieved from the internet in 1 page. https://www.youtube.com/watch?v=InviOrV5zWY.

Helicopter Or Plane? The Revolutionary Rotodyne, by Mustard, YouTube [online], published on Oct. 23, 2019, [retrieved on Jun. 14, 2023], retrieved from the internet in 1 page. https://www.youtube.com/watch?v=dkJOm1V77Xg.

Ulrich, "Design, Development, Analysis and Control of a Bio-Inspired Robotic Samara Rotocraft," UMD Theses and Dissertations, Aerospace Engineering Theses and Dissertations, 2012. http://hdl.handle.net/1903/14161.

Saetti et al., "Performance and Design Optimization of the F-Helix eVTOL Concept," Department of Aerospace Engineering, The Pennsylvania State University, 2020. http://ierom.it/docs/2020_paper5_final_qt.pdf.

AIM 2020—Concurrent Optimization of Flapless Samara (Voice Presentation), YouTube [online], published Dec. 9, 2020, [retrieved Jun. 14, 2023], retrieved from the internet in 1 page. https://www.youtube.com/watch?v=6D0yzQjINEw.

Conradie, "Helicopter Seed Robot Can Drop Like A Rock," website [online], published Aug. 7, 2021, [retrieved Jun. 14, 2023], retrieved from the internet in 15 pages. https://hackaday.com/2021/08/07/helicopter-seed-robot-can-also-drop-like-a-rock/.

"THOR hovers like a helicopter by can fly long-distance," website [online], published Aug. 8, 2018, [retrieved Jun. 14, 2023], retrieved from the internet in 4 pages. https://foresttech.events/thor-hovers-like-a-helicopter-but-can-fly-long-distance/.

* cited by examiner

700A

| Performance | Example Monocopter | Example Quadcopter | Comparison |
|---|---|---|---|
| Efficiency | 2.64 Grams/Watt | 0.85 Grams/Watt | ~3X Better! |
| Flight Time for Same Battery Capacity | ~90 Minutes | ~30 Minutes | ~3X Longer! |
| Noise at Takeoff | +68.2 dBA | +80.5 dBA | ~4X Quieter! |
| Descent on Power Failure | 2.3 Meters/Sec- Parachute Extra Load not needed | 4.2 Meters/Sec- After Parachute Deployed | ~2X Better! |

FIG. 7A

ROTARY AND FIXED WING CONVERTIBLE AIRCRAFT WITH MONOCOPTERS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. For example, this application claims the benefit of U.S. Provisional Patent Application No. 63/352,369, filed Jun. 15, 2022, and titled "ROTARY AND FIXED WING CONVERTIBLE AIRCRAFT WITH MONOCOPTERS," the entire disclosure of which is hereby made part of this specification as if set forth fully herein and incorporated by reference for all purposes and for all that it contains.

BACKGROUND

Field

The present disclosure relates to the field of aircraft. More specifically, implementations of the present disclosure relate to systems and methods for unmanned flying devices and aggregating and controlling unmanned flying devices during flight.

Discussion of Related Art

A background is provided for introductory purposes and to aid the reader in understanding the detailed description. The background should not be taken as an admission of any prior art to the claims.

Remote control drones are commonly used for enjoyment and other purposes. Various remote control airplanes, helicopters, quadcopters, and the like are available on the market. With increasing miniaturization of electronics and development of new battery and motor technologies, such devices have become cheaper to manufacture, more reliable, and more popular. Some such devices are even making their way into commercial and other non-toy uses, such as for aerial photography, search and rescue, package delivery, various military applications. Existing solutions to drones are limited in flight time. For example, power is used inefficiently given the approach of existing drones to flight techniques. Improvements to these and other drawbacks of existing solutions to drones are desirable.

SUMMARY

The systems, methods, and devices described herein each have several aspects, no single one of which is solely responsible for its desirable attributes. Without limiting the scope of this disclosure, several non-limiting features will now be described briefly.

In some aspects, the techniques described herein relate to an unmanned flying device including: a main body; a wing pivotally coupled to the main body; a wing actuator operably coupled to the wing and configured to pivot the wing about a first axis; a propulsion unit pivotally coupled to the main body; a propulsion unit actuator operably coupled to the propulsion unit and configured to pivot the propulsion unit about a second axis; a control system including one or more processors configured to control operation of the wing actuator, the propulsion unit, and the propulsion unit actuator; a communication system configured to communicate wirelessly with one or more external systems, transmit data to the control system, and receive data from the control system; and a power source configured to provide power to the wing actuator, the propulsion unit, the propulsion unit actuator, the control system, and the communication system, wherein the first axis and the second axis are positioned such that, with the wing in a first configuration and the propulsion unit in a first configuration, thrust generated by the propulsion unit can rotate the unmanned flying device in a manner that causes the wing to generate lift.

In some aspects, the techniques described herein relate to an unmanned flying device, wherein the second axis is orthogonal to the first axis.

In some aspects, the techniques described herein relate to a flying device, further including a latching unit attached to the main body and configured to connect the main body of the flying device with one or more other flying devices.

In some aspects, the techniques described herein relate to a flying device, wherein the latching unit includes an electro-mechanical latching mechanism including: a latch solenoid in communication with the controller, wherein the controller engages the latch solenoid to maintain or release connection between two or more flying devices.

In some aspects, the techniques described herein relate to a flying device, wherein the latching unit includes an electromagnetic latching mechanism including: an electro-magnet in communication with the controller, wherein the controller engages the electro-magnet to maintain connection between two or more flying devices.

In some aspects, the techniques described herein relate to a flying device, wherein the controller is further configured to control the propulsion unit actuator, the wing actuator, and the propulsion unit to enter one or more flight modes.

In some aspects, the techniques described herein relate to a flying device, wherein the one or more flight modes includes a hovering flight mode, a translation flight mode, an autorotation descent mode, and/or a freefall mode.

In some aspects, the techniques described herein relate to a flying device further including a payload unit attached to the main body, wherein the payload unit is configured to provide a means to transport one or more objects by the flying device.

In some aspects, the techniques described herein relate to a flying device further including a motion sensor connected to the main body and configured to provide inertial data to the controller.

In some aspects, the techniques described herein relate to a flying system including: a plurality of flying devices, each flying device including: a main body; a wing pivotally coupled to the main body; a wing actuator operably coupled to the wing and configured to pivot the wing about a first axis; a propulsion unit pivotally coupled to the main body; a propulsion unit actuator operably coupled to the propulsion unit and configured to pivot the propulsion unit about a second axis; a control system including one or more processors configured to control operation of the wing actuator, the propulsion unit, and the propulsion unit actuator; a latching unit attached to the main body and configured to connect the main body of the flying device with one or more of the other flying devices; a communication system configured to communicate wirelessly with one or more external systems, transmit data to the control system, and receive data from the control system; and a power source configured to provide power to the wing actuator, the propulsion unit, the propulsion unit actuator, the control system, and the communication system, wherein the first axis and the second axis are positioned such that, with the wing in a first configuration and the propulsion unit in a first configuration, thrust generated by the propulsion unit can rotate the flying system in a manner that causes the wing to generate lift; and wherein each latching unit of each flying device is connected with an other flying device to maintain a multi-copter configuration during flight.

In some aspects, the techniques described herein relate to a flying system, wherein each controller of each flying device is further configured to control its respective propulsion unit actuator, wing actuator, and motor such that the flying system achieves a fixed-wing flight mode, which includes one or more of the wings being in a first orientation and one or more of the wings being in a second orientation.

In some aspects, the techniques described herein relate to a flying system, wherein each controller of each flying device is further configured to control its respective propulsion unit actuator, wing actuator, and motor such that the flying system achieves a vertical takeoff and landing flight mode, which includes each of the wings being in a generally vertical orientation.

In some aspects, the techniques described herein relate to a flying system, wherein each controller of each flying device is further configured to control its respective propulsion unit actuator, wing actuator, and motor such that the flying system achieves a rotational flight mode, which includes each of the wings being oriented at a pitch that can generate upward thrust.

In some aspects, the techniques described herein relate to a flying system, wherein the plurality of flying devices includes four flying devices.

In some aspects, the techniques described herein relate to a flying system, wherein each controller of each flying device is further configured to operate its latching unit to cause the flying devices to detach from one another during flight.

In some aspects, the techniques described herein relate to a method of operating a plurality of flying devices connected together to form a multi-copter, the method including: engaging a plurality of latching mechanisms to connect the plurality of flying devices into a multi-copter flying system; receiving a first instruction to enter a first flight mode; based on the received first instruction, orienting a wing of each flying device vertically, such that a leading or trailing edge of the wing is facing upward; orienting a propulsion unit of each flying device such that each propulsion unit will produce thrust in a direction that will cause upward flight; and receiving a second instruction to enter at least one of a second flight mode or a third flight mode.

In some aspects, the techniques described herein relate to a method, wherein the second instruction is to enter the second flight mode, the second flight mode being a rotational flight mode, the method further including: based on the received second instruction, orienting the propulsion unit of each flying device such that the propulsion unit will produce thrust in a rotational direction about a vertical axis; and orienting the wing of each flying device such that the wings generate lift as the plurality of flying devices rotate about the vertical axis.

In some aspects, the techniques described herein relate to a method further including: receiving a third instruction to disaggregate the plurality of flying devices; and disengaging the plurality of latching mechanism to disaggregate the plurality of flying devices.

In some aspects, the techniques described herein relate to a method further including based on the disaggregation of the plurality of flying devices, entering a rotational flight mode with each flying device of the plurality of flying devices.

In some aspects, the techniques described herein relate to a method, wherein the second instruction is to enter the third flight mode, the third flight mode being a fixed wing flight mode, the method further including: based on the received second instruction, orienting at least two propulsion units of the plurality of flying devices such that the at least two propulsion units of the plurality of flying devices produce thrust toward a horizontal direction; and orienting at least two wings of the plurality of flying devices such that the at least two wings generate lift as the plurality of flying devices move in the horizontal direction.

BRIEF DESCRIPTION OF THE DRAWINGS

The foregoing and other features, aspects, and advantages of the present disclosure are described in detail below with reference to the drawings of various implementations, which are intended to illustrate and not to limit the disclosure. The drawings comprise the following figures in which:

FIG. 7A-7B are tables and charts showing example comparisons of capabilities of monocopters according to the present disclosure versus traditional quadcopter designs.

DETAILED DESCRIPTION

Figure 1:
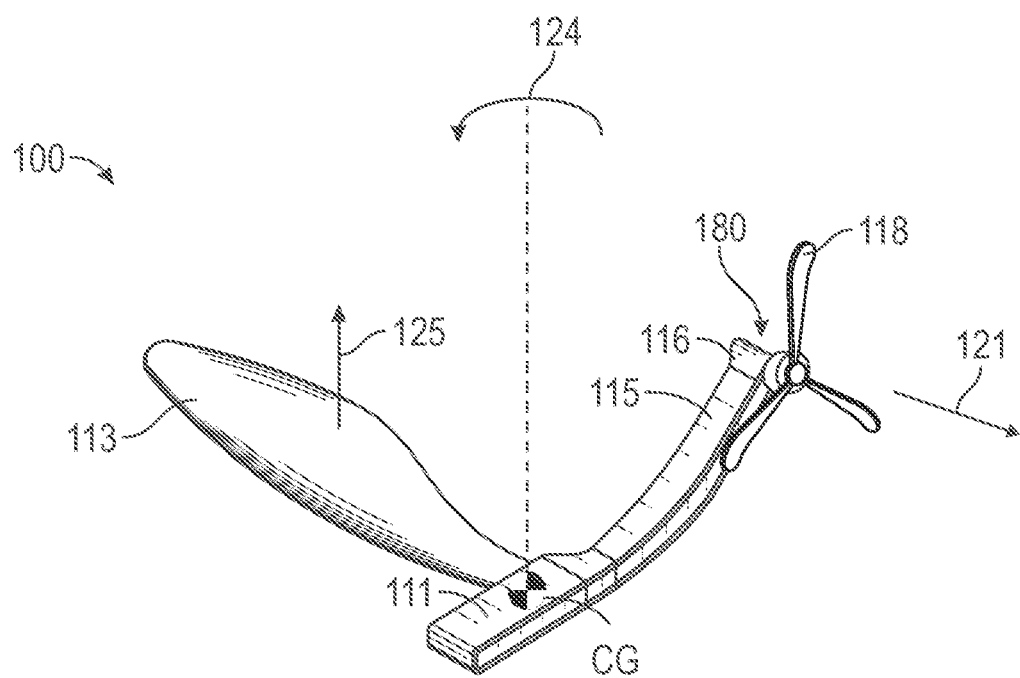
FIG. 1 illustrates an example implementation of an unmanned flying device.

Although several implementations, examples, and illustrations are disclosed below, it will be understood by those of ordinary skill in the art that the disclosure described herein extends beyond the specifically disclosed implementations, examples, and illustrations and includes other uses of the disclosure and obvious modifications and equivalents thereof. Implementations of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific implementations of the disclosure. In addition, implementations of the disclosure can comprise several novel features and no single feature is solely responsible for its desirable attributes or is essential to practicing the disclosures herein described.

I. Overview

The disclosure herein provides systems, methods, and devices for unmanned flying devices (hereinafter "flying device"), and for aggregated flying devices forming flying systems. A flying device can operate by continuously rotating the body of the flying device to maintain flight. The flying device can operate in one or more flight modes such as an autorotation mode, a hover mode, and/or a differential parachute mode (if applicable) to support various objectives. For example, flying devices can be used in surveillance applications (e.g., image and/or video capture), aerial photography applications, environment monitoring applications (e.g., providing airborne sensors such as temperature, pressure, humidity, inertial, motion, and/or the like for a location), military and/or defense applications (e.g., delivering explosives), humanitarian applications (e.g., delivering medical supplies to remote locations) and/or the like. A flying device may include a connection system thereby enabling two or more flying devices to be connected. The aggregation of two or more flying devices can form the flying system. The flying system may also be configured to enable the aggregated flying devices to disconnect from one another during flight, each flying device then continuing flight on its own.

The terms "drone" or "flying device" are used interchangeably herein to refer to an unmanned flying device, whether the device is remotely controlled and/or comprises at least some self-guidance, self-stabilization, and/or autonomous flight technology. In some implementations, the term flying device may be used to refer to a monocopter, a rotary wing aircraft, and/or a mono-wing rotary aircraft, that generally includes a propeller and a computer, processor, or microcontroller configured to vary the speed of the propeller (and/or to adjust an orientation of a wing) to enable the monocopter to rotate and generate lift. In some implementations, the term multi-copter may be used to refer to aggregated flying devices, which includes connecting two, three, four, five or more flying devices such that the one or more computers, processors, or microcontrollers are configured to individually vary the speed of each propeller (and/or to adjust the orientation of each wing) to enable the multi-copter to fly in a desired manner. The techniques disclosed herein, however, may be used with various types of flying devices or flying systems. For example, a flying device that uses the technologies disclosed herein may be, for example, a tricopter, a hexacopter, a pentacopter, an octocopter, a helicopter, an airplane, and/or the like. Further, the techniques disclosed herein may be utilized with flying devices that are fully self-guided or autonomous, meaning no external user input is required in real time during flight, and/or may be used with flying devices that require at least some external user input during flight. Some embodiments of flying systems are shown and described having four flying devices each, but it is understood that two, three, five or more flying devices may be aggregated together using the features described herein for systems having four flying devices.

Example Aspects Related to a Flying Device

The flying device, such as a monocopter, can include, for example, a main body, a wing, at least one motor with a propeller, a power source, a communication module, a controller (e.g., flight control avionics), and a latching mechanism. Advantageously, the flying device can be more reliable than a conventional quadcopter, operating with significantly fewer moving parts. The motor and propeller may be positioned at one end of the main body. The wing (e.g., a rotor or the like) may be positioned close to the center of gravity (CG) of the main body. The motor and propeller's rotational axis can be in a horizontal plane, perpendicular or parallel to the longitudinal axis of the wing. The thrust produced by the motor and propeller of the flying device may cause the flying device to rotate about a vertical axis. In some implementations, the horizontal thrust of the motor and propeller is at least about 90 grams. The center of rotation of the flying device can occur near one end of the main body. Rotation of the main body about a vertical axis provides airflow across the wing, producing lift. The flying device can achieve flight by increasing rotational velocity of the flying device until the lift generated by the wing exceeds the weight of the flying device. In some implementations, the flying device can weigh about 192 grams. Advantageously, the architecture of the flying device leverages thrust augmentation, providing comparable efficiency to fixed wing aircraft. In one implementation, the flying device can have an efficiency of about 2.64 grams/watt. In one implementation, the thrust to weight ratio of a flying device can be about 1:5 to about 1:2. In contrast, conventional quadcopters may generally require a thrust to weight ratio of more than 1:1 to achieve vertical takeoff. Further, the motor and propeller may be positioned such that the flying device can provide increased kinetic energy storage which may result in enhanced autorotation, providing further energy savings. For example, the flying device may have a flight time of about 90 minutes.

The power source can be a battery (e.g., Lithium Ion or Lithium Polymer battery that may be recharged, regular batteries such as AAA and/or the like, or there may be alternative power provided through other means, such as solar, among others). The power source may be located within the main body and/or external to the main body. Advantageously, the power source can be positioned such the flying device can provide increased kinetic energy storage during flight, which may result in enhanced autorotation.

The communication module can enable the flying device to communicate wirelessly with an external source such as a user device (e.g., a cell phone, a remote controller, a laptop, a server, or the like). Additionally, the communication module (and/or the controller) can enable the flying device to communicate with one or more additional flying devices. Advantageously, when more than one flying device are connected into a flying system, the flying device may communicate with one or more other flying devices within the flying system (for example, the flying devices may communicate with one another to achieve different flight modes of the flying system). The communication module may enable a pilot to fly the flying device via a remote control.

The controller can comprise one or more processors, microprocessors, microcontrollers, application specific integrated circuits, field programmable gate arrays, and/or the like. The controller can instruct the motor and propeller to generate thrust. In some implementations, the controller may apply one or more control schemes to conserve energy such as applying a duty cycle to the motor and propeller while the flying device is in a hovering mode, a translation flight mode and/or the like. In other implementations, the controller may deenergize the motor and propeller to enable the flying device to descend at a low velocity via an autorotation mode. An autorotation mode can provide lift to minimize the descent rate and/or minimize the severity of a landing. Advantageously, the flying device can achieve a lower descent velocity without the necessity of a parachute, in comparison to a conventional quadcopter configured with a parachute having a similar surface area. For example, the flying device may descend in an autorotation mode at about 2.3 meters per second while a conventional quadcopter configured with a parachute may descend at approximately 4.2 meters per second. Additionally, the flying device entering an autorotation mode may not lose altitude during deployment of a parachute. For example, a conventional quadcopter may lose approximately 100 feet of altitude while deploying a parachute. Advantageously, the flying device described herein can autorotate resulting in virtually no time and/or altitude loss due to a parachute deployment.

The controller may enable a differential parachuting flight mode. For example, the controller may change from an autorotational mode, where the motor and propeller are deenergized, to a hover mode (i.e., powered flight mode) on demand, to increase, maintain, and/or decrease altitude, maintain a position, and/or flying along a determined flight path.

Additionally, the controller may instruct one or more additional actuators of the flying device. For example, the controller may be configured to instruct one or more actuators (e.g., motor, servo, solenoid or the like) to enable the wing of the flying device to rotate about a lateral axis to increase and/or decrease a pitch angle of the wing. The controller may be further configured to instruct one or more actuators to enable rotation of a propulsion unit comprising the motor and propeller about a longitudinal axis, such that the propulsion unit may rotate to convert the flying system between various flight modes. Additionally, the controller may be configured to enable a latching mechanism to aggregate and/or disaggregate one or more flying devices. It should be noted that, although various implementations disclosed herein are configured to rotate the wing about an axis (e.g., a lateral axis) that is perpendicular or orthogonal to an axis about which the propulsion unit rotates (e.g., a longitudinal axis), the techniques disclosed herein are not limited to such a configuration. For example, some implementations may orient these two axes at an angle that is no more than 5, 10, 15, or 20 degrees away from perpendicular or orthogonal.

The controller may determine one or more flight modes of the flying device based on a user input and/or autonomously. The controller may include computer readable memory, storing one or more flight programs governing one or more operations of the flying device. For example, the flying device may operate in an autopilot mode, wherein the controller operates the flying device based a pre-configured program. The autopilot mode may not require input from for example, an external source (e.g., a user device as described herein). Additionally, and/or alternatively, the controller may receive one or more instructions from an external source to control the flying device, for example, to change between one or more flight modes, flight patterns, and/or to control additional functionality of the flying device, such as to record data from one or more sensors.

The flying device may be configured with one or more latching mechanisms. A latching mechanism may be actively controlled (requiring control and/or power from the flying device) and/or passively controlled (wherein the latching mechanism maintains connection and automatically unlatches if, for example, a threshold force is exceeded). The latching mechanism may be utilized to aggregate two or more flying devices into a flying system. For example, the latching mechanism may be used to group two, three, four, five, and/or more flying devices.

In one implementation, an electro-magnetic latching mechanism may be utilized to connect two or more flying devices. The electro-magnetic latching mechanism can include one or more electromagnets in electrical communication with the controller. Further, a corresponding flying device may include a latching surface (e.g., a ferromagnetic surface and/or the like) to provide a location for the electromagnet to connect. The controller may supply a current to the electromagnet to engage and/or disengage the latching mechanism. The electro-magnetic latching mechanism can either be normally open (i.e., requiring electrical energy to latch the latching mechanism which may result in a power draw form the power source) and/or normally closed (i.e., requiring electrical energy to unlatch the latching mechanism). Additionally and/or alternatively another control scheme may be employed. In an example implementation, the electro-magnetic latching mechanism is normally closed, requiring, for example, the controller to provide electrical energy to the latching mechanism when disaggregation of a group arrangement of flying devices is desired.

In one implementation, an electromechanical latching mechanism may be utilized to connect two or more flying devices. An electromechanical latching mechanism can include a solenoid in electrical communication with the controller. The solenoid may be connected to a plunger providing, for example, linear motion to momentarily move a pivoting latch from an engaged position to a disengaged position. Further, a corresponding flying device may include a latching surface (e.g., a surface configured to receive a latch and/or the like). The electromechanical latching mechanism can operate in a normally open convention, where the solenoid is energized to latch two or more flying devices, and/or a normally closed convention, where the solenoid is energized to unlatch two or more flying devices. In an additional implementation, the electro-mechanical latching mechanism can latch and unlatch two or more flying devices utilizing rotary motion to disengage a rotating latch. For example, a motor (e.g., servo, rotary actuator and/or the like) may be in electrical communication with the controller. The motor provides rotary motion to disengage two or more flying devices via, for example, a cam, camshaft, a rotating screw having gears, and/or any mechanism that can be used to maintain connection between two or more flying devices. Advantageously, the latching mechanisms disclosed herein can consume a relatively small amount of electrical energy to connect and disconnect two or more flying devices.

In one implementation, the latching mechanism may be passively controlled. A passive latching mechanism may include any mechanical means of connecting one or more flying devices without requiring an output from a controller to disaggregate the flying system. For example, a flying system may exceed a threshold rotational velocity, triggering one or more of a set of magnets, a friction, a clutch, a cam, and/or any other form of latching mechanism to disaggregate the one or more flying devices (for example, due to the centrifugal force generated by spinning the flying system at the threshold rotational velocity).

The flying device can include a payload. For example, a payload may be attached to the main body of the flying device. The payload can be about 23 grams. The payload can include any item for transport and/or operation for the desired mission of the flying device. A flying device may be further configured for a specific mission. For example, the flying device may be configured with surveillance and/or monitoring equipment (e.g., a camera, a video recorder, sensors, and/or the like).

Example Aspects Related to an Aggregated Flying System

Advantageously, two or more flying devices, such as two or more monocopters, may be connected (herein called a "flying system"). The latching mechanism of each flying device as described herein may be enabled, thereby connecting the flying devices to form a single multi-wing aircraft. Generally, flying devices used as part of a flying system can be configured with one or more actuators (e.g., motor, servo or the like) to enable the wing(s) to rotate about a lateral axis to increase and/or decrease a pitch angle of the wing as described herein. Additionally, the flying devices used as part of a flying system can be configured with one or more actuators (e.g., motor, servo or the like) to enable rotation of the propulsion unit comprising the motor and propeller about a longitudinal axis such that the propulsion unit may rotate to convert the flying system between various flight modes, such as any of the flight modes described herein. Advantageously, the flying system described herein can be scaled in size to accommodate large payloads (e.g., carrying explosives for military applications, medical supplies to remote locations, and/or any other payload).

The flying system may operate in one or more flight modes based on a specific mission of the flying system (and/or based on the current state of the flying system). For example, a flying system may operate in at least a vertical flight mode, a rotational flight mode, and/or a fixed wing fight mode. Additionally, the flying system may change between the one or more flight modes during flight (and/or before or after flight). For example, from a first flight mode to a second and/or third flight mode, from a second flight mode to a first and/or third flight mode, and/or from a third to a first and/or second flight mode or the like. As described herein, one or more controllers of each flying device may communicate with one or more connected flying devices of a flying system to operate the flying system in the one or more flight modes.

Unlike traditional monocopters, flying devices as part of a flying system may not require landing gear or special surfaces for takeoff and/or landings. Traditional monocopter designs require that the whole aircraft rotate on the ground before developing sufficient vertical thrust to become airborne. Thus, traditional monocopter aircraft designs require landing gear and/or special surfaces to prevent damage to the fuselage, sensors, and/or or cameras that may be located on the bottom of the monocopter during takeoff and/or landings. The flying systems disclosed herein, however, can takeoff vertically, via a vertical flight mode, and then disaggregate to form individual flying devices. The reduced weight of the flying devices herein may also contribute to efficient energy consumption, longer flight times, and more reliable usage when compared to traditional monocopter designs.

Example Aspects Related to a Vertical Takeoff & Landing Flight Mode

In a first flight mode, such as a vertical flight mode, a group arrangement of flying devices as a flying system can be configured for vertical takeoff and/or landing. Additionally, the flying devices in combination as a flying system can be configured to operate in a similar fashion as traditional quadcopters, hexacopters and/or similar copters with a multitude of motors and propellers. In an example implementation, the first flight mode includes four flying devices connected to form a flying system (however any quantity of flying devices may be connected to form a flying system). For vertical takeoff of the flying system in the first flight mode, the propulsion units of each flying device can be rotated so the motors and propellers produce vertical thrust upward. The wings of each flying device may be rotated into a vertical position as to substantially reduce vertical drag. For the flying system to become airborne in the first flight mode, the thrust to weight ratio of the flying system can be about 1:1. Although the first flight mode can be the least efficient flight mode as compared to one or more other flight modes, the first flight mode provides the ability of the flying system to vertically takeoff and land (VTOL). Advantageously, VTOL capabilities may enable the flying system to operate in areas where a fixed wing aircraft may not be able to operate. Additionally, and/or alternatively, VTOL capabilities may reduce the physical impacts of takeoff and/or landing in comparison to one or more additional flight modes, thereby increasing the reliability of the flying devices. In an example implementation, once the flying system is airborne, the flying system may convert to one or more additional flight modes.

Example Aspects Related to a Rotational Flight Mode

In a second flight mode, such as a rotational flight mode, a group arrangement of the flying devices as a flying system can be configured to hover by, for example, rotating about a vertical axis of the flying system. To achieve the second flight mode, the propulsion units of each flying device can be rotated to produce horizontal thrust (e.g. thrust with a vector component in a horizontal direction) such that the flying system rotates about the vertical axis. Additionally, the flying system may adjust the pitch angle of the wings for each flying device before and/or while the flying system rotates about the vertical axis. The resultant pitch angle of each wing can generate upward force (e.g., lift) as the flying system rotates, thereby producing a hover that can be more efficient than if hovering just using the thrust of the propulsion units (like a quadcopter would hover). Further, the flying system can move in any direction in the second flight mode, such as by selectively adjusting the pitch of individual wings. Advantageously, a second flight mode may provide efficiencies over many traditional quadcopter designs. For example, a second flight mode (such as a rotational flight mode) may provide a thrust to weight ratio of from about 1:5 to about 1:2, thereby enabling the flying system to consume less energy while flying, in comparison to one or more additional flight modes.

Example Aspects Related to a Fixed Wing Flight Mode

In a third flight mode, such as a fixed wing flight mode, the flying system can be configured to operate similar to a fixed wing aircraft. The flying system can convert to a fixed wing flight mode by rotating at least two wings to a pitch angle that produces lift. Wings not used to produce lift may be rotated to minimize drag as the flying system operates along a flight path. Further, the flying system can rotate at least two propulsion units to provide forward thrust. The remaining propulsion units can continue to provide upward thrust (or in some cases could be deactivated and/or could be used to help guide the flying system). The thrust to weight ratio of the third flight mode may be efficient, in the range of from about 1:5 to about 1:2, as is commonly observed in fixed wing aircraft. Advantageously, a third flight mode (such as a fixed wing flight mode) can provide a substantially faster ground speed in comparison to one or more additional flight modes.

Example Aspects Related to Disaggregating a Flying System

Disaggregation occurs when the flying devices of the flying system separate from one another, and operate as individual flying devices (e.g., as individual monocopters). After disaggregation, the flying devices may hover, execute a flight path, and/or enter any other flight mode as described herein. Additionally, and/or alternatively, after disaggregation, a flying device may autorotate to provide a safe descent, for example, in the case of a power failure and/or a low-power situation. Advantageously, when the flying system disaggregates into several flying devices, surveillance and/or environmental monitoring may be enhanced by providing a plurality of measurements from one or more locations and/or providing a plurality of images from a plurality of locations and/or a plurality of viewing angles.

Disaggregation of the flying system may be achieved, for example, while operating in a second flight mode (i.e., a rotational flight mode) and/or any other flight mode as described herein. In an example implementation, the flying system is operating in a second flight mode (such as a rotational flight mode). While operating in a second flight mode the flying system may increase the thrust produced by each motor and propeller, thereby substantially increasing the rotational velocity of the flying system. The centrifugal force generated by the substantially increasing rotational velocity will aid in separating the flying devices. Once the rotational velocity of the system is increased to a desired amount, each flying device may activate their respective latching mechanism. Once disaggregated, the flying devices can enter any flying device flight mode as described herein. As noted above, disaggregation may be accomplished during various flight modes of the flying system. Disaggregation during the rotational flight mode can have some benefits, however. For example, due to the rotation of the flying system during disaggregation, the translational momentum generated will tend to cause the individual flying devices to naturally translate away from one another once the latching mechanisms are activated and/or released. Further, due to the rotation of the flying system in the rotational flight mode, there will also tend to be some rotational momentum acting on the individual flying devices after disaggregation. In some implementations, the rotational flight mode is configured to rotate the flying system in a direction that will cause the rotational momentum to be in a direction that assists in initial vertical thrust generation of the wings of each of the flying devices after disaggregation.

Prior to disaggregation, a centrifugal force generated by the rotational velocity of the flying system in a second flight mode may increase friction between components of the latching mechanism, requiring additional energy to unlatch the flying devices. In a further implementation, permanent magnets can be positioned on one or more faces of the main body of the flying devices, and/or in contact with each other while the flying devices form a flying system. The one or more magnets can provide a sufficient engagement force to reduce the friction caused by the latching mechanism during periods of increased centrifugal force, such that the latching mechanism may operate at increased rotational velocities. Additionally and/or alternatively, the one or more magnets may aid in aligning the one or more flying devices when forming a flying system.

II. Example Flying Device Implementations

FIG. 1 is an example implementation of a flying device 100 (in this case, a monocopter). Flying device 100 can include a main body 111, a wing 113 (e.g., a wing, a blade, a rotor, and/or the like), an arm 115, and a propulsion unit 180 that includes a motor 116 and a propeller 118. Propulsion units disclosed herein may be interchangeably referred to as thrusters. Further, although some implementations of propulsion units described herein include a motor and propeller, other implementations of propulsion units may be utilized with any implementations of flying devices disclosed herein. For example, propulsion units or thrusters that comprise compressed gas, combustible gas, jet engines, and/or the like may be utilized. The main body 111 of the flying device may include a controller (avionics), along with other sensors to operate the flying device 100 (similar to, for example, at least some of the components shown in FIG. 6A). The wing 113, for example at or near a root of the wing, may be positioned close to the center of gravity CG of the main body 111. The arm 115 may be connected to the main body 111 as illustrated in FIG. 1. The arm 115 may be an extension of the main body 111. The arm 115 can support the motor 116. The motor 116 can have a shaft configured to connect to a propeller 118. The propeller 118 can rotate perpendicular or parallel to a longitudinal axis defined by the wing 113 (for example, see FIG. 2). The horizontal thrust 121 produced by the motor 116 and propeller 118 of the flying device 100 may cause the flying device 100 to rotate about a vertical axis 124. In some implementations, the horizontal thrust 121 of the motor 116 and propeller 118 is about 90 grams. The thrust 121 may be from about 50 grams to about 150 grams, from about 75 grams to about 125 grams, at least 50 grams, at least 75 grams, at least 90 grams, at least 100 grams, or at least 110 grams. The center of rotation of the flying device 100 can occur at or near one end of the main body 111. Rotation of the main body 111 about a vertical axis 124 provides airflow across the wing 113, producing vertical thrust 125 in the upward direction. The flying device 100 can achieve flight by increasing rotational velocity about the vertical axis 124 of the flying device 100 until vertical thrust 125 generated by the wing 113 exceeds the weight of the flying device 100. In some implementations, the flying device 100 can weigh about 192 grams. Advantageously, the architecture of the flying device 100 leverages thrust augmentation, providing similar efficiency to fixed wing aircraft. For example, the thrust to weight ratio of the flying device 100 according to the present disclosure can be 1 or less than 1, for example from about 1:5 to about 1:2. In contrast, conventional quadcopters may generally require a thrust to weight ratio of more than 1:1 to achieve vertical takeoff. Further, the motor 116 and propeller 118 may be positioned such that the flying device 100 can provide increased kinetic energy storage which may result in enhanced autorotation.

Figure 2:
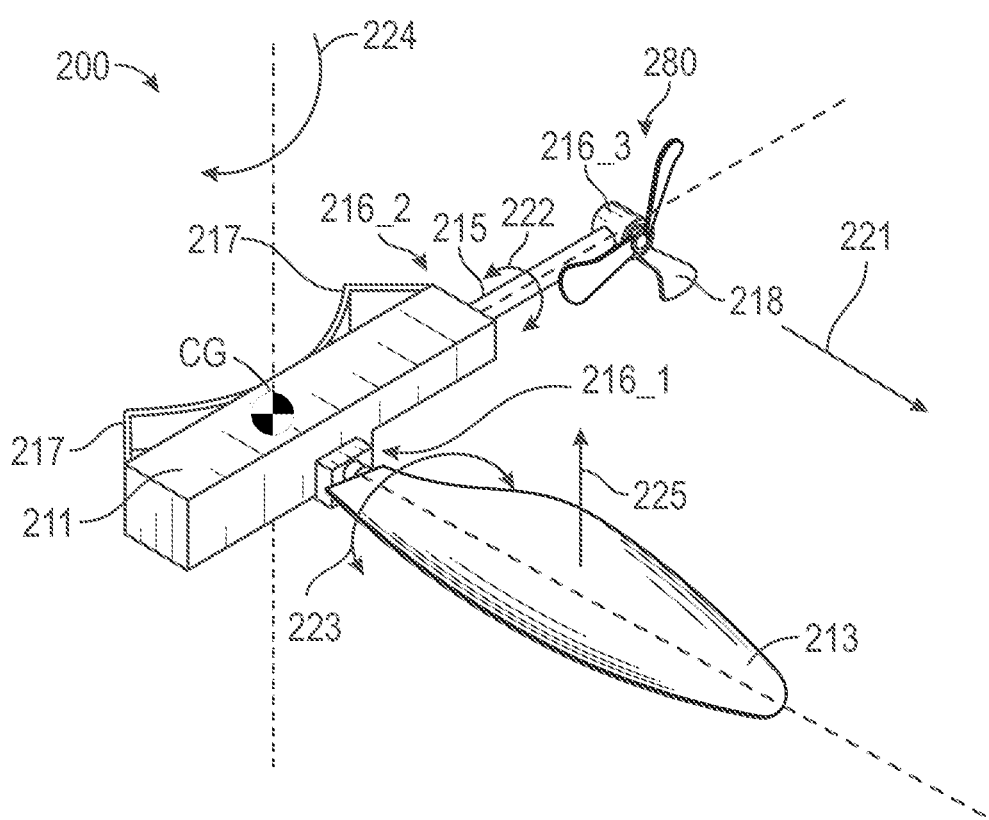
FIG. 2 illustrates another example implementation of an unmanned flying device.

FIG. 2 is another example implementation of a flying device 200. The flying device 200 has some similarities to the flying device 100, such as being configured to fly as a monocopter, and the same or similar reference numbers are used to refer to the same or similar components. The flying device 200 may include any of the same features or functions of the flying device 100. The flying device 200 has several benefits as compared to the flying device 100, however, such as the ability to aggregate with other flying devices into a flying system, and the ability to adjust the orientations of the wing and propulsion unit with respect to the main body, among other differences.

The example flying device 200 can be attached to one or more additional flying devices 200 as described herein. The flying device 200 includes a main body 211, a wing 213 (e.g., a wing, a blade, a rotor, and/or the like), and an arm 215 (e.g., an arm, a shaft, a protruding member, a pivotally connected member, and/or the like). The main body 211, the wing 213 and/or the arm 215 can be manufactured from any suitable material, such as for example, wood, fiberglass, carbon fiber, aluminum, plastic, and/or the like. In one implementation, the main body 211, the wing 213 and/or the arm 215 include carbon fiber. The wing 213 may be positioned close to the center of gravity CG of the main body 211. The wing 213 can be any length suitable for flight, and can have any cross-sectional shape suitable for flight (such as, for example, an airfoil shape). In one implementation, the wing 213 is from about 10 centimeters (CM) to about 35 cm, from about 15 cm to about 30 cm, or about 23 cm in length. The arm 215 may be connected to the main body 211 as illustrated in FIG. 2, and may more specifically be pivotally connected, as further described below.

The flying device 200 can further include a propulsion unit 280, which includes a motor 216_3 and a propeller 218 coupled to an output shaft of the motor. The propulsion unit 280 can be positioned at a distal end of the arm 215. The flying device 200 can further include a plurality of actuators, motors, and/or the like to cause powered rotation, movement, and/or the like of various components. For example, the flying device 200 includes an actuator 216_1 to control rotational orientation of the wing 213 about the lateral axis 223 with respect to the main body 211, and an actuator 216_2 to control rotational orientation of the arm 215 (and thus of the propulsion unit 280), about a longitudinal axis 222 that extends along the arm 215, with respect to the main body 211.

As discussed above, the arm 215 can support the propulsion unit 280 and thus also the motor 216_3. The motor 216_3 can rotate a shaft configured to connect to the propeller 218. The motor 216_3 can be, for example, an AC motor, a DC motor, a servo, and/or the like. In one implementation, the motor is a 75 watt, brushless DC motor. The propeller 218 can rotate perpendicular or parallel to the lateral axis 223 extending longitudinally along the wing 213 (or can be oriented differently in some implementations). The propeller 218 can have any number of blades or rotors (e.g., 1, 2, 3, 4 or more) extending radially from a center hub. In one implementation, the propeller 218 is a 3-rotor propeller. In one implementation, each rotor of the propeller is from about 2 cm to about 12 cm, from about 4 cm to about 10 cm, from about 5 cm to about 8 cm, about 6 cm, or about 6.35 centimeters. The horizontal thrust 221 produced by the motor 216_3 and propeller 218 of the propulsion unit 280 of the flying device 200 may cause the flying device 200 to rotate about a vertical axis 224. In some implementations, the horizontal thrust 221 of the motor 216_3 and propeller 218 is about 90 grams at 60 watts.

The center of rotation of the flying device 200 can occur at or near one end of the main body 211. Rotation of the main body 211 about the vertical axis 224 provides airflow across the wing 213, producing vertical thrust 225. The flying device 200 can achieve flight by increasing rotational velocity about the vertical axis 224 of the flying device 200 until vertical thrust 225 generated by the wing 213 exceeds the weight of the flying device 200. In some implementations, the flying device 200 can weigh about 192 grams. Advantageously, the architecture of the flying device 200 leverages thrust augmentation, providing comparable efficiency to fixed wing aircraft. For example, the thrust to weight ratio of the flying device 200 can be 1 or less than 1, for example from about 1:5 to about 1:2. In contrast, conventional quadcopters may generally require a thrust to weight ratio of more than 1:1 to achieve vertical takeoff. Further, one or more components of the flying device (e.g., the motor 216_3, the propeller 218, control electronics, a power source, and/or any other component or part of the flying device) may be positioned such that the flying device 200 can provide increased kinetic energy storage which may result in enhanced autorotation.

The flying device 200 can further include one or more latching mechanisms 217. The latching mechanism 217 may also be referred to interchangeably herein as a latching unit. The latching mechanisms 217 can be attached to the main body 211. The latching mechanism 217 may be actively controlled (requiring control and/or power from the flying device) and/or passively controlled (wherein the latching mechanism maintains connection and automatically unlatches if, for example, a threshold force is exceeded). The latching mechanism 217 may be utilized to aggregate, e.g. connect, more than one flying device 200 together to form a flying system. The latching mechanism 217 may be used to aggregate two, three, four, five, or more flying devices 200. In this implementation, the flying device 200 includes two latching mechanisms 217, with each of the two latching mechanisms 217 being configured to couple with a complementary latching mechanism 217 of one other flying device 200 (as shown, for example, in FIGS. 5A-5C). Other implementations may include a different number of latching mechanisms 217.

The actuators 216_1 and 216_2 can be positioned internal to the main body 211 and/or positioned external to the main body 211. For example, in the implementation shown in FIG. 2, the actuator 216_1 can be seen at least partially external to the main body 211, while the actuator 216_2 is mostly internal to the main body 211. A portion of the actuator 216_2 can be seen in flying device 200_3 of FIGS. 5A-5D described below. The actuators 216_1 and 216_2 and the motor 216_3 are also represented by the actuator(s)/motor(s) 608 block of the system diagram of FIG. 6A, described below.

The actuators 216_1 and 216_2 can comprise, for example, a motor, an actuator, a servo, a solenoid and/or the like. The actuator 216_1 can be configured to enable the wing 213 of the flying device 200 to rotate about a lateral axis 223 to increase and/or decrease a pitch angle of the wing. The actuator 216_2 can be configured to enable rotation of the arm 215 (and thus of the propulsion unit 280 comprising motor 216_3 and propeller 218) about the longitudinal axis 222. Advantageously, actuator 216_2 can enable the motor 216_3 and propeller 218 to rotate to convert flying device 200 as part of a flying system from one or more flight modes to another flight mode.

Figure 3:
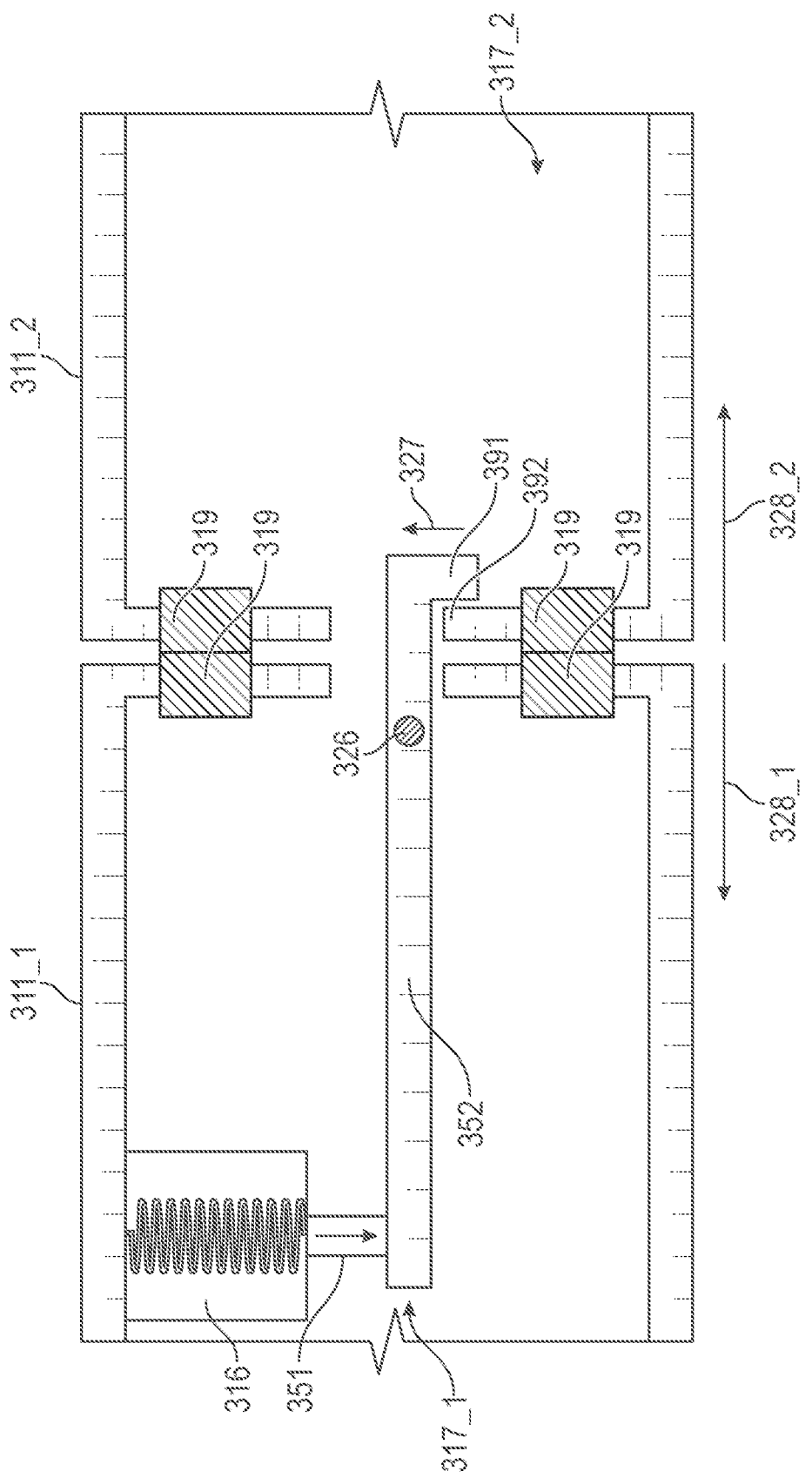
FIG. 3 is an example implementation of an electromechanical latching mechanism.

FIG. 3 is an example implementation of two electromechanical latching mechanisms 317_1, 317_2 connected together, each representative of an example of one of the latching mechanisms 217 of the flying device 200 of FIG. 2. The latching mechanisms 317_1, 317_2 may be utilized to aggregate two or more flying devices into a flying system. For example, the latching mechanisms 317_1, 317_2 may be used to group two, three, four, five, or more flying devices. The latching mechanism 317_1 can include a solenoid 316 having a plunger 351, one or more magnets 319, and a release mechanism 352. The solenoid 316 can be attached to the main body 311_1 of the flying device 200. The solenoid 316 can be, for example, an actuator, a servo, a solenoid, a motor, and/or the like. The solenoid 316 can be configured to engage and disengage the main body 311_1 and 311_2. The plunger 351 may move in one or more directions, for example linearly, radially, and/or axially, to generate a force to engage and disengage the latching mechanism 317. The release mechanism 352 may have a distal and proximal end. The proximal end of release mechanism 352 may be attached to the plunger 351, while a portion of the distal end of the release mechanism 352 may be attached to the main body 311_1, causing the release mechanism 352 to pivot about pivot point 326 when the solenoid 316 is energized to move the plunger 315 downward as oriented in the figure. The release mechanism 352 may pivot via pivot point 326 causing a release motion 327. The release motion 327 may cause the main body 311_1 and 311_2 to disengage in direction 328_1 and direction 328_2 respectively.

The latching mechanisms 317_1 and 317_2 can each include magnets 319 that are positioned to engage one another, as shown in FIG. 3. The magnets 319 can be positioned on one or more faces of the main body 311_1 and 311_2 respectively. The magnets 319 can be in contact with each other while main bodies 311_1 and 311_2 are connected. As described herein, prior to disaggregation, a centrifugal force generated by the rotational velocity of the flying system in a second flight mode may increase friction between components of the latching mechanism 317, requiring additional energy to unlatch the flying devices. The one or more magnets 319 can provide a sufficient engagement force to reduce the friction caused by the latching mechanism 317 during periods of increased centrifugal force, such that the latching mechanism 317 may operate at increased rotational velocities. For example, with reference to FIG. 3, the release mechanism 352 comprises a protruding member 391, such as a lip or catch, positioned to engage a mating portion 392, such as a protrusion or the like, of body 311_2, to resist or prevent separation of body 311_2 from body 311_1. As the centrifugal force increases due to increasing rotational velocity, mating portion 392 may tend to be forced toward or even against protruding member 391 with increasing force. This may increase the friction between mating portion 392 and protruding member 391, thus requiring more force from the solenoid 316 in order to release body 311_2 from body 311_1. The magnets 319 can tend to at least partially counteract the friction due to the centrifugal force, thus reducing the force required from the solenoid 316. For instance, the magnets 319 may maintain a separation between the two bodies 311_1 and 311_2, such as between the protruding member 391 and the mating portion 392.

In some implementations, a flying device, such as the flying device 200 of FIG. 2, may include the latching mechanism 317_1 as the latching mechanism 217 at one end of the main body 211, and may include the latching mechanism 317_2 as the latching mechanism 217 at the other end of the main body 211 (for example as "male" and "female" latching mechanisms, respectively). With such a configuration, if multiple additional flying devices have similar configurations, the multiple complementary latching mechanisms 317_1 and 317_2 will be aligned such that they can connect multiple flying devices 200 together. It should be noted, however, that various other implementations of latching mechanisms may be used, as long as they fulfill the functionality of holding multiple flying devices together and selectively releasing the flying devices from each other.

As noted above, the electro-mechanical latching mechanism 317_1 can operate in a normally open configuration, where the solenoid 316 is energized to latch two or more flying devices 200 (e.g., main body 311_1 and 311_2), and/or a normally closed configuration, where the solenoid 316 is energized to unlatch two or more flying devices 200. In an additional example implementation, the electro-mechanical latching mechanism 317_1 can latch and unlatch two or more flying devices 200 utilizing rotary motion to disengage a rotating latch. For example, the solenoid 316 (e.g., servo, rotary actuator and/or the like) can be in electrical communication with the controller. The solenoid 316 can be oriented axially toward an adjacent flying device 200 and provide rotary motion to axially retract and disengage two or more flying devices 200 via, for example, a cam, camshaft, a rotating screw having gears, and/or any mechanism that can be used to maintain connection between two or more flying devices 200. Advantageously, the latching mechanism disclosed herein can consume a relatively small amount of electrical energy to connect and/or disconnect two or more flying devices.

Latching mechanisms disclosed herein can be electro-magnetic latching mechanisms. An electro-magnetic latching mechanism can include one or more electromagnets in electrical communication with the controller. Further, a corresponding flying device may include a latching surface (e.g., a ferromagnetic surface and/or the like) to provide a location for the electro-magnet to connect. In some embodiments, the controller may supply a current to the electro-magnet to engage and/or disengage the latching mechanism. The electro-magnetic latching mechanism can either be normally open (i.e., requiring electrical energy to latch the latching mechanism) and/or normally closed (i.e., requiring electrical energy to unlatch the latching mechanism). Additionally and/or alternatively another control scheme may be employed. In an example implementation, the electro-magnetic latching mechanism is normally closed, requiring, for example, the controller to provide electrical energy to the one or more latching mechanisms when disaggregation of a group arrangement of flying devices is desired.

In one implementation, the latching mechanism may be passively controlled. A passive latching mechanism may include any mechanical means of connecting one or more flying devices without requiring an instruction from the controller to disaggregate the flying system. For example, a flying system may exceed a threshold rotational velocity, triggering one or more of a set of magnets, a friction, a clutch, a cam, and/or any other form of latching mechanism to disaggregate the one or more flying devices.

Figure 4:
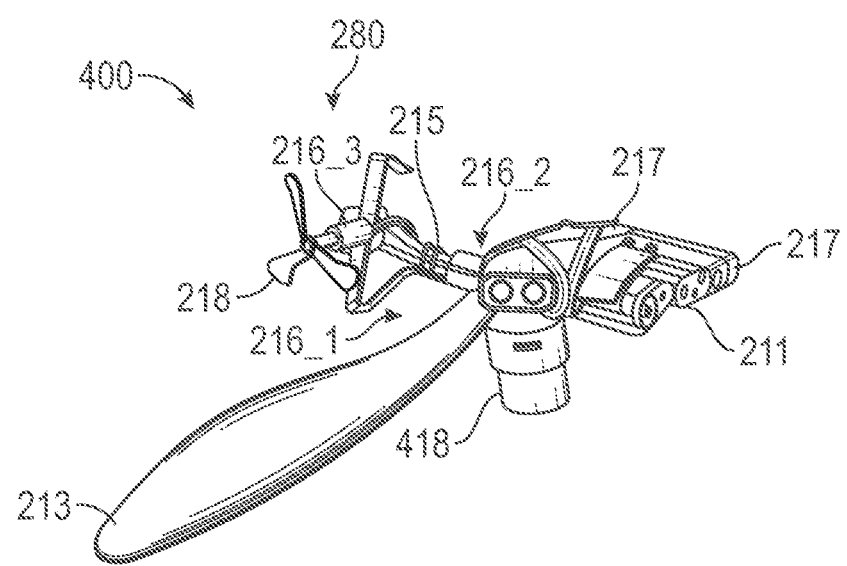
FIG. 4 illustrates another example implementation of an unmanned flying device.

FIG. 4 is another example implementation of a flying device 400. The flying device 400 may have the same or similar features and/or functions as the flying device 200 of FIG. 2, and vice versa. The flying device 400 can be attached to one or more additional flying devices 400 as described herein. The same or similar reference numbers are used to refer to the same or similar features as in FIG. 2.

The flying device 400 may include a payload 418. The payload can be attached to the main body 211 of the flying device 400. The payload 418 can be configurable for a specific mission. For example, the flying device may be configured with surveillance and/or monitoring equipment (e.g., a camera, a video recorder, or the like), one or more environmental sensors and/or a payload. In one implementation, the payload 418 can be about 23 grams. The payload 418 can include any item for transport and/or operation for the desired mission of the flying device. Advantageously, a flying system as described herein can be scaled in size to accommodate large payloads (e.g., carrying explosives for military applications, medical supplies to remote locations, and/or any other payload). The payload 418 may also be added to any other embodiments described herein, including flying device 200 of FIG. 2. In some embodiments, the payload 418 has a favorable aerodynamic shape (i.e., rounded, and/or smoothed edges). In some embodiments, the payload 418 is attached to another location, such as the top and/or sides of the main body 211. In some embodiments the payload 418 is attached to another portion of the flying device 400.

III. Example Implementation of a Flying System & Example Flight Modes

As noted above, a flying device may include one or more latching mechanisms, thereby enabling two or more flying devices to be connected. The aggregation of two or more flying devices can form a flying system. The flying system may be controlled by one or more flying devices and/or external systems. The flying system may operate in one or more flight modes, such as for example, a vertical takeoff and landing mode, a rotational mode, and/or a fixed wing mode. The flying system can change between a flight mode to another flight mode mid-flight, enabling the flying system to leverage the efficiencies of one or more flight modes during the course of a flight. The flying system can disaggregate, causing separation of each individual flying device from the flying system. Disaggregation can occur, for example, while the flying system is in the rotational flight mode. The flying system may disaggregate, for example, by increasing a rotational velocity of the rotational fight mode, and disengaging the latching mechanisms, causing the two or more connected flying devices to disconnect from one another. The separated flying devices, which may each be a monocopter, can then operate in one or more flight modes as noted above.

Figure 5A:
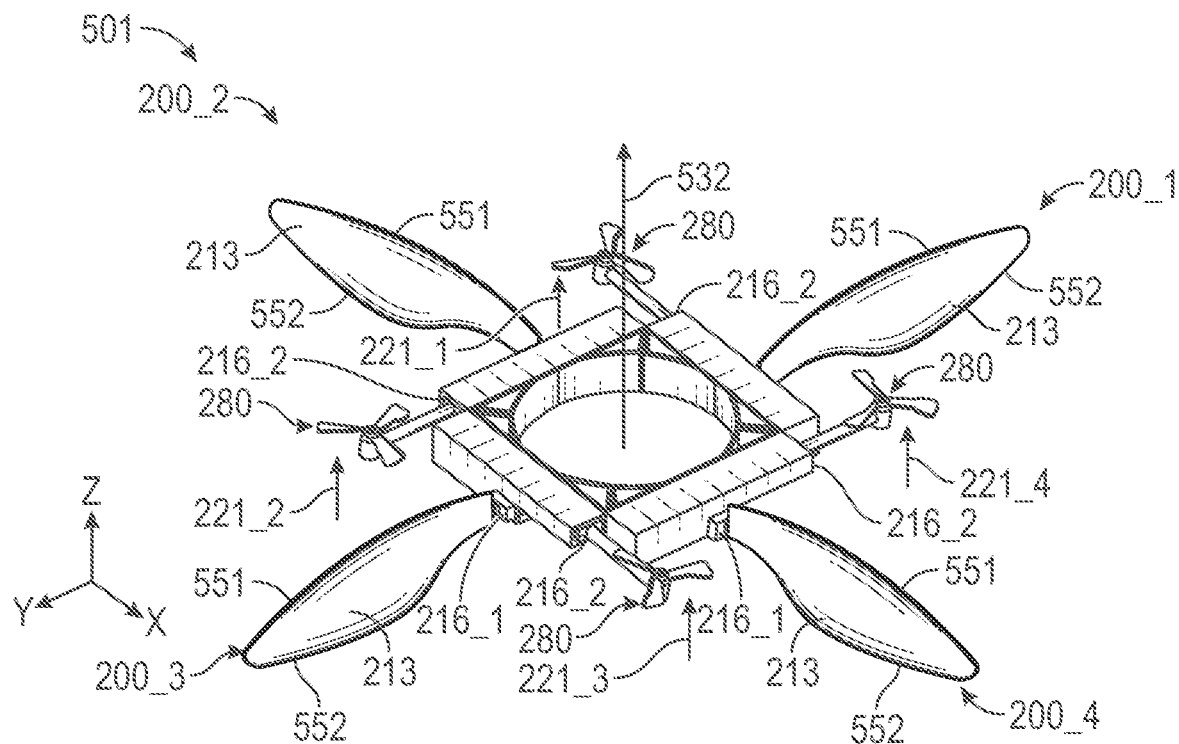
FIG. 5A is an example implementation of a flying system comprising four of the unmanned flying devices of FIG. 2, the flying system operating in a first flight mode.

FIG. 5A is an example implementation of a flying system 501 operating in a first flight mode, such as a vertical takeoff and landing mode. The flying system 501 as shown includes four flying devices 200_1, 200_2, 200_3, and 200_4. The flying system 501 may include two, three, five, six, seven, eight, nine, ten, or more flying devices 200, as mentioned. The flying devices 200_1-4 can be the same as and/or similar to any of the flying devices as described above with reference to FIG. 2 and/or as described elsewhere herein. The same reference numbers as used in FIG. 2 are used to refer to the same or similar features. In a first flight mode, the flying system 501 can be configured to achieve a flight path 532 for vertical takeoff and/or landing as illustrated in FIG. 5A. Additionally, the flying system 501 can be configured to operate in a similar fashion as traditional quadcopters, hexacopters and/or similar copters with a multitude of motors and propellers. Thus, the flight path 532 of flying system 501 may be in any direction as a traditional quadcopter may fly, such as horizontally and/or vertically.

To enter the first flying mode, the propulsion units 280 of each flying device 200_1-4 can be rotated using actuators 216_2 such that the motors and propellers produce vertical thrust upward 221_1, 221_2, 221_3, and 221_4. The wings 213 of each flying device may be rotated using actuators 216_1 into a vertical orientation or position as illustrated in FIG. 5A, to substantially reduce vertical drag. For example, as shown in FIG. 5A, a leading edge 551 of each wing 213 may be oriented upward, and a trailing edge 552 of each wing 213 may be oriented downward. In some implementations, the wings 213 may be oriented differently, such as with the leading edges 551 downward, and the trailing edges 552 upward. A local reference XYZ axis system is indicated for the wing 213 on the bottom left as oriented in the figure, to further illustrate the orientation. The X, Y and Z axes are mutually orthogonal and follow the "right hand rule." As shown, that wing 213 has the leading edge 551 facing a +Z direction that is parallel to the upward vertical direction or flight path 532. The wing 213 extends longitudinally in a +Y direction that extends laterally and perpendicularly to the upward vertical direction or flight path 532. The +X direction extends perpendicularly away from the surface of the wing 213 in a horizontal plane (the +X direction may not be perfectly perpendicular to the wing 213 surface, e.g. due to camber in the airfoil shape of the wing 213). Each wing 213 may have this same orientation.

For the flying system to become airborne in the first flight mode, the thrust to weight ratio of the flying system can be about 1:1. Although the first flight mode can be the least efficient flight mode as compared to one or more flight modes, the first flight mode provides the ability of the flying system 501 to vertically takeoff and land. Advantageously, VTOL capabilities may enable the flying system to operate in areas where a fixed wing aircraft may not be able to operate. Additionally, and/or alternatively VTOL capabilities may reduce the physical impacts of takeoff and/or landing in comparison to one or more additional flight modes, thereby increasing the reliability of the flying devices. In an example implementation, once the flying system is airborne, the flying system may convert to one or more additional flight modes.

Figure 5B:
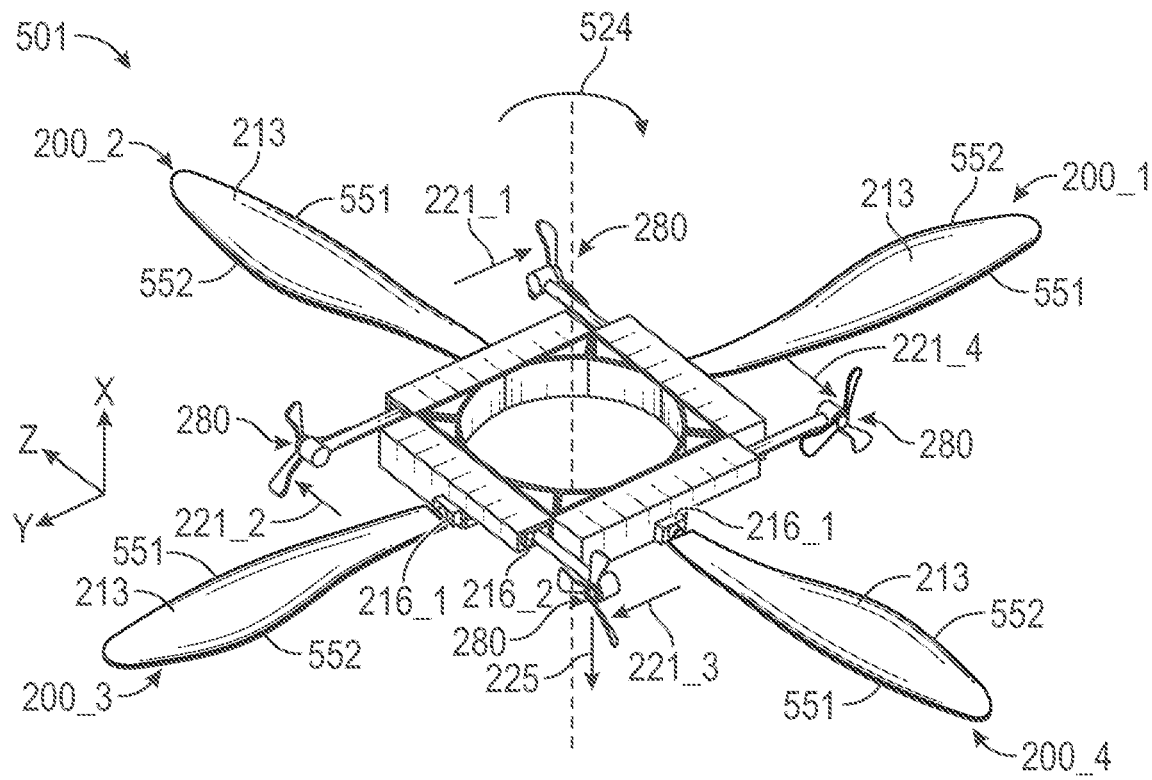
FIG. 5B is an example implementation of the flying system of FIG. 5A operating in a second flight mode.

FIG. 5B is an example implementation of the flying system 501 operating in a second flight mode, such as a rotational flight mode. In the second flight mode, the flying system 501 can be configured for a rotational hover about a vertical axis 524. To achieve the second flight mode, the propulsion units 280 of the flying system 501 can be rotated using actuators 216_2 to produce horizontal thrusts 221_1, 221_2, 221_3 and 221_4, such that the flying system 501 rotates about the vertical axis 524. Additionally, the flying system 501 may adjust the pitch angle of the wings 213 using actuators 216_1 for each flying device 200 as the flying system 501 rotates about the vertical axis 524. Each wing 213 may be rotated such that the leading edge 551 is facing in the generally horizontal direction toward the direction of rotation, and the trailing edge is facing in the opposite generally horizontal direction ("horizontal" here includes angled positions where the wing is not perfectly horizontal, such as due to an angled orientation of the wing with respect to the horizontal plane, and/or due to a camber in the airfoil shape of the wing). For clarity, the same XYZ axis system from FIG. 5A is indicated as rotated in FIG. 5B for the rotated wing 213 on the lower left as oriented in the figure. As shown, after rotation of the wing 213, the +Z direction is now in the horizontal plane and facing toward the direction of rotation of the flying system 501. The +Y direction still extends in the horizontal plane away from the flying system 501. The +X direction is now facing upward and parallel to the vertical axis 524. Each wing 213 may have this same orientation. The resultant pitch angle of each wing can generate upward thrust 225 (e.g., lift) as the flying system 501 rotates, thereby producing a relatively efficient hover. Further, the flying system 501 can move in any direction, similar to a traditional quadcopter in the second flight mode. Advantageously, the second flight mode may provide efficiencies over many traditional quadcopter designs. For example, the second flight mode may provide a thrust to weight ratio of about 1:5 to about 1:2, thereby enabling the flying system 501 to consume less energy while flying in comparison to one or more additional flight modes.

Figure 5C:
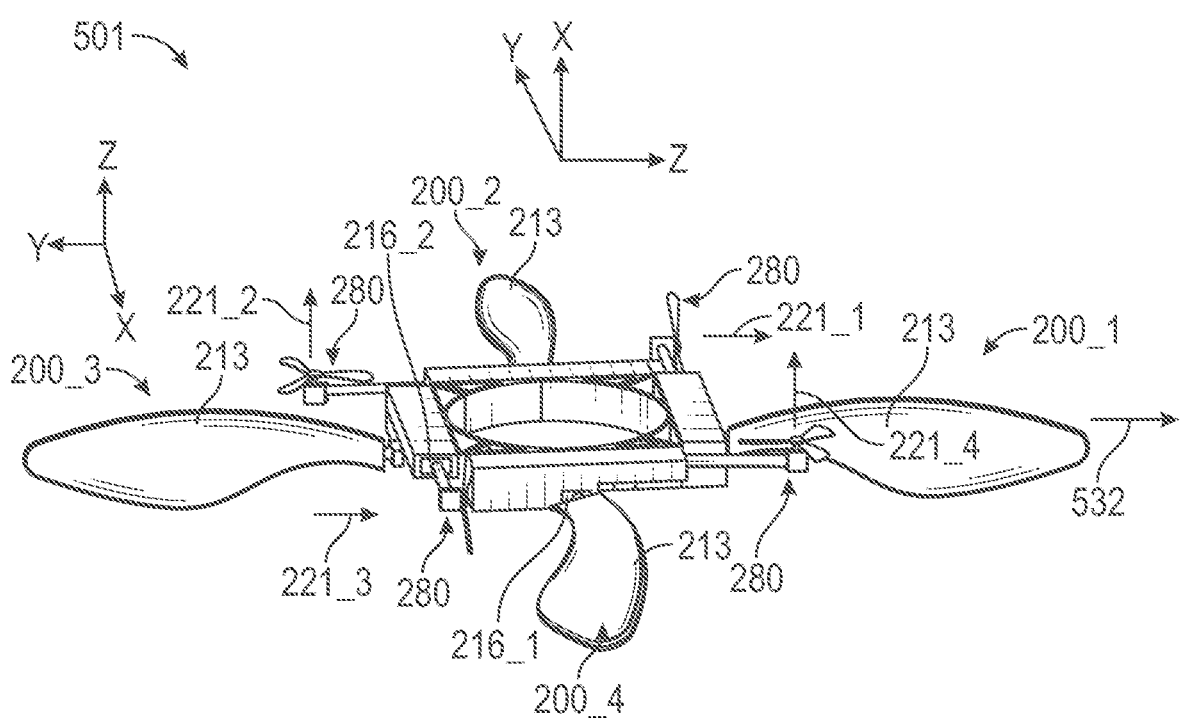
FIG. 5C is an example implementation of the flying system of FIG. 5A operating in a third flight mode.

FIG. 5C is an example implementation of the flying system 501 operating in a third flight mode, such as a fixed wing flight mode. In the example implementation of FIG. 5C, flying system 501 can convert to a fixed wing flight mode by rotating at least two wings 213 (e.g., the wings 213 of flying devices 200_2 and 200_4) using actuators 216_1 to a first orientation or pitch angle that produces a favorable lift to weight ratio along the flight path 532. Wings not used to produce lift (e.g., the wings 213 of flying devices 200_1 and 200_3) may be rotated using actuators 216_1 to a second orientation (such as a vertical orientation, as shown in FIG. 5C) to reduce or minimize drag as the flying system 501 operates along flight path 532. For clarity, the same XYZ axis system from FIGS. 5A and 5B are shown for two of the wings 213. As shown, the wing 213 on the left as oriented in the figure has +Z direction facing vertically upward, the Y axis in the horizontal plane and extending rearwardly away from the flying system 501, and the +X direction in the horizontal plane. The opposite wing 213 on the right as oriented may have a similar orientation, with the +Y direction extending forward. The wing 213 on the far side of the flying system 501 (or top of the figure) as oriented has the +Z direction in the direction of flight path 532, the +Y direction in the horizontal plane and extending laterally away from the flying system 501, and the +X direction in the upward vertical direction. The opposite wing 213 on the near side (or bottom) of the figure as oriented may have a similar orientation. Further, the flying system 501 can rotate at least two propulsion units 280 to provide forward thrust 221_1 and 221_3. The remaining propulsion units 280 can continue to provide upward thrust 221_2 and 221_4. The thrust to weight ratio of the third flight mode may be relatively efficient, such as in the range of about 1:5 to 1:2, as is commonly observed in fixed wing aircraft. Advantageously, the third flight mode can provide a substantially faster ground speed in comparison to one or more additional flight modes. In some embodiments, one or more of the wings 213 may be a fixed wing that does not rotate. In some embodiments, the flying system may change pitch angle while flying along flight path 532 such that the wing 213 on the left of the figure and/or the wing 213 on the right of the figure as described herein may act as a vertical stabilizer (i.e., a rudder and/or the like). In some embodiments, the pitch angle of the flying system can be controlled by rotating the position of one or more propulsion units 280.

Figure 5D:
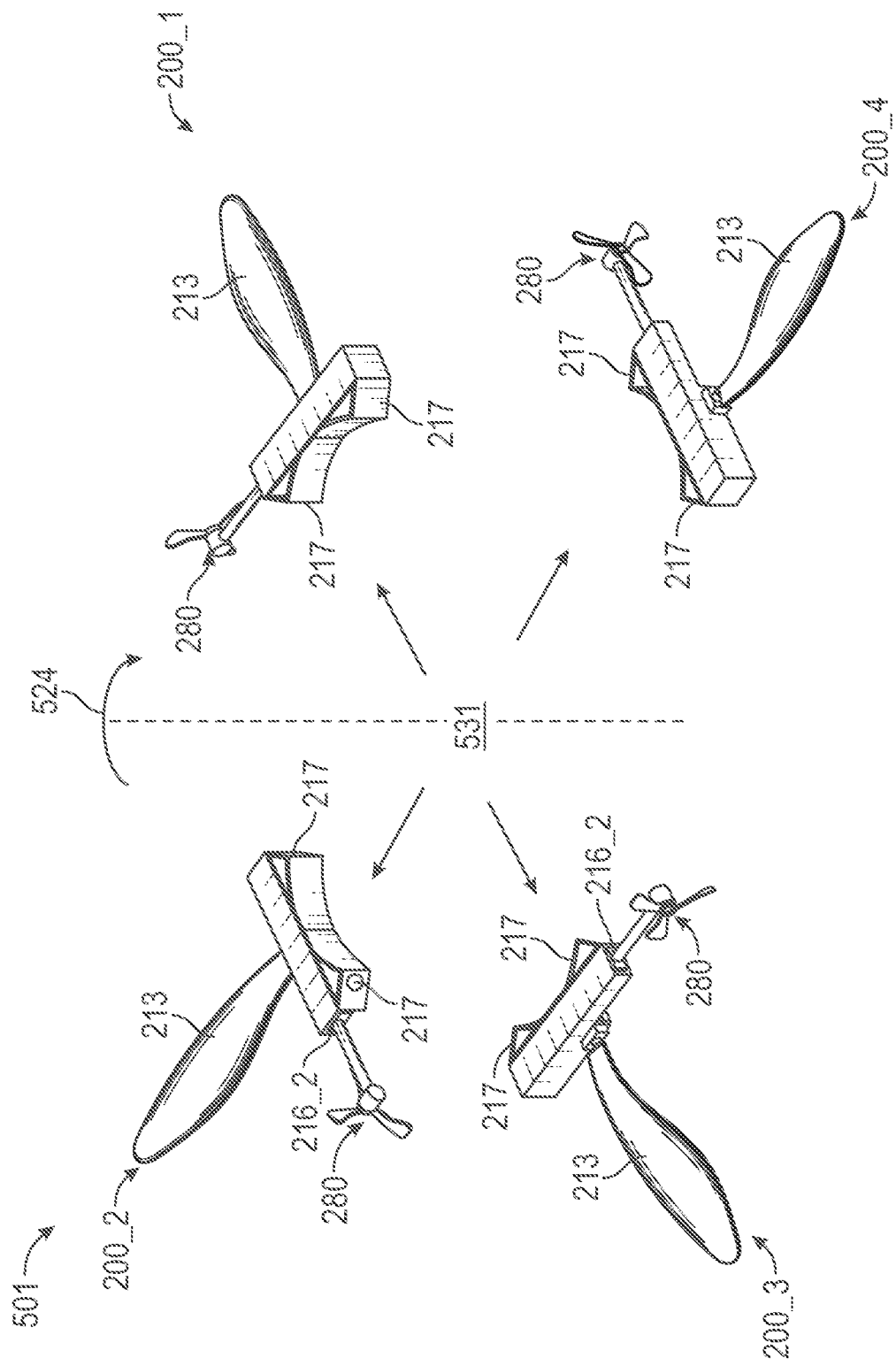
FIG. 5D is an example illustration of the flying system of FIG. 5A disaggregated into four individual, separate flying devices.

FIG. 5D is an example illustration of the flying system 501 while disaggregating the four flying devices 200_1, 200_2, 200_3, and 200_4. As noted above, disaggregation occurs when each flying device 200_1-4 of the flying system 501 separates, and operates individually (such as via monocopter flight), as flying devices 200_1-4. After disaggregation, the flying devices 200_1-4 may hover, execute a flight path, and/or enter any other suitable flight mode as described herein. Additionally, and/or alternatively, after disaggregation, a flying device 200_1-4 may autorotate to provide a safe descent, for example, in the case of a power plant failure.

Disaggregation of the flying system 501 may be achieved, for example, while operating in a second flight mode (i.e., a rotational flight mode) and/or any other flight mode as described herein. In an example implementation, the flying system 501 is operating in a rotational flight mode. The flying system 501 may increase the thrust produced by each motor and propeller, thereby substantially increasing the rotational velocity of the flying system 501. The centrifugal force generated by the substantially increased rotational velocity can aid in separating the flying devices 200_1-4. Once the rotational velocity of the system is increased to a desired amount, each flying device 200_1-4 may activate their respective latching mechanism or mechanisms (e.g., latching mechanism 217 and/or 317_1). Disengaging each latching mechanism while the flying system experiences a substantially increased rotational velocity may cause separation of the flying system 501 in the disaggregation directions 531 (e.g., in directions that are generally away from and/or perpendicular the vertical axis 524). Once disaggregated, the flying devices 200_1-4 can enter any flying device flight mode as described herein.

IV. Flying Device and Flying System Diagrams

Figure 6A:
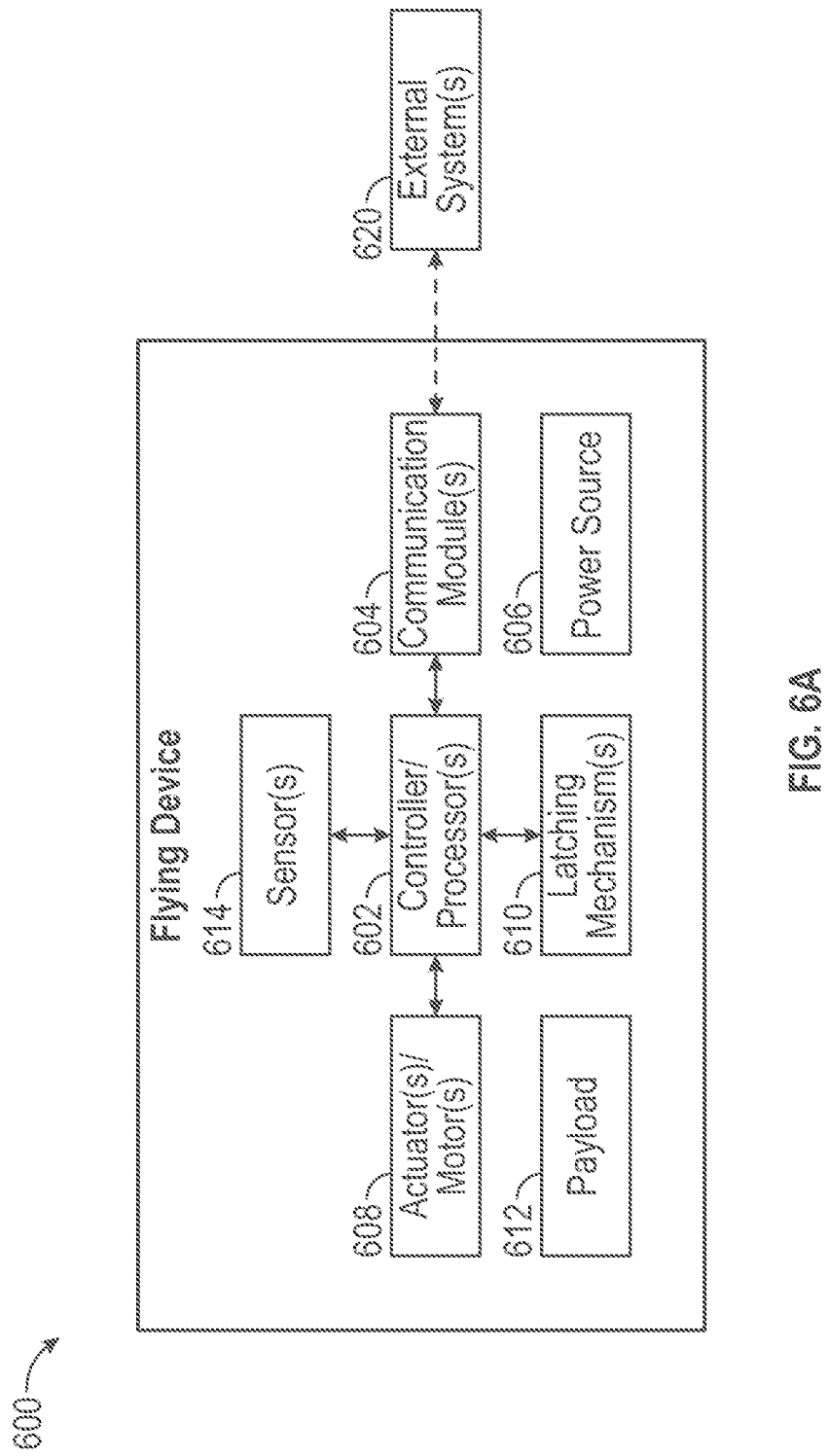
FIG. 6A is a block diagram of another example implementation of a flying device.

FIG. 6A is a block diagram of the internal and/or electrical components of an example flying device 600. The flying device 600 may be the same as, or similar to, any of the other flying devices described herein, such as flying device 200 of FIG. 2. Further, any of the features shown in FIG. 6A may be included in any of the other flying devices disclosed herein, and any of the features shown in any of the other flying devices disclosed herein may be incorporated into flying device 600. For example, the actuator(s)/motor(s) 608 may correspond to any of the propulsion units, actuators, and/or motors disclosed herein with reference to other flying devices. As another example, the latching mechanism(s) 610 may correspond to any of the latching mechanisms or units disclosed herein with reference to other flying devices.

The example flying device 600 can include one or more controller(s) 602 (herein after "controller"), a communication module 604, a power source 606, one or more actuators and/or motors 608, one or more latching mechanism(s) 610, a payload 612, and one or more sensor(s) 614. Additionally one or more external system(s) 620 can be in communication with the flying device 600.

The controller 602 can be or comprise one or more processors, microprocessors and/or the like configured to control operations of the flying device 600. The controller may be in communication with the communication module 604, the power source 606, the actuator(s)/motor(s) 608, the latching mechanism(s) 610, sensor(s) 614, and/or a payload 612. For example, controller 602 can energize one or more motor(s) 608 to generate thrust from a propeller.

In some implementations, the controller 602 may apply one or more control schemes to conserve energy as the flying device is in flight. For example, the controller 602 may apply a duty cycle to the motor(s) 608 and propeller while the flying device 600 is in a hovering mode. In other implementations, the controller 602 may deenergize the motor(s) 608 and propeller to enable the flying device 600 to descend at a low velocity via an autorotation mode. An autorotation mode can provide lift to minimize the descent rate and/or minimize the severity of a landing. Advantageously, a flying device 600 can achieve a lower descent velocity without the necessity of a parachute, in comparison to a conventional quadcopter configured with a parachute having a similar surface area as described herein.

The controller 602 may enable a differential parachuting flight mode. For example, the controller 602 may change from an autorotational mode, where the motor(s) 608 and propeller are deenergized, to a hover mode (i.e., powered flight mode) on demand to increase, maintain, and/or decrease altitude, maintain a position, and/or maintain a pre-loaded or determined flight path.

Additionally, the controller 602 may instruct one or more additional motor(s) 608 of the flying device 600. For example, the controller may be configured to instruct one or more motor(s) 608 (e.g., actuator, servo, solenoid or the like) to enable the wing of the flying device 600 to rotate about a lateral axis to increase and/or decrease a pitch angle of the wing. The controller 602 may be further configured to instruct one or more motor(s) 608 to enable rotation of a motor and propeller about a longitudinal axis, such that the motor and propeller may rotate to convert a flying system between various flight modes. Additionally, the controller 602 may be configured to enable a latching mechanism(s) 610 to connect and/or disaggregate one or more flying devices.

The controller 602 may determine one or more flight modes and/or flight operations of the flying device 600 based on a user input and/or autonomously. The controller 602 may include computer readable memory, storing one or more flight programs governing one or more operations of the flying device 600. For example, the flying device 600 may operate in an autopilot mode, wherein the controller 602 operates the flying device based a pre-loaded program. The autopilot mode may not require input from, for example, external system(s) 620 (e.g., a user device as described herein). Additionally, and/or alternatively, the controller 602 may receive one or more instructions from external system(s) 620, and control the flying device 600 based on the received instructions. For example, a received instruction may request that the controller 602 change one or more flight modes, flight patterns, and/or to control additional functionality of the flying device 600, such as to record data from one or more sensor(s) 614.

Further, when two or more flying devices 600 are connected, forming a flying system, controller 602 may communicate with another controller 602 of the flying system. Communication between controllers 602 can include, for example, determining one or more flight modes of the flight system, determining whether to disaggregate the flying system, and/or any other communication as described herein.

The communication module 604 can enable the flying device 600 to communicate with, for example, external system(s) 620 wirelessly, such as a user device (e.g., a cell phone, a remote controller, a laptop, a server, or the like). In one implementation, the communication module 604 (and/or the controller 602) can enable the flying device 600 to communicate with one or more separate flying devices 600. Further, when two or more flying devices 600 are connected into a flying system 601, the flying devices 600 may communicate with one or more other flying devices 600 within a flying system (for example, the flying devices 600 may communicate with one another to achieve different flight modes of the flying system).

The power source 606 can be a battery (e.g., Lithium Ion or Lithium Polymer battery that may be recharged, regular batteries such as AAA and/or the like), or there may be alternative power provided through other means, such as solar, among others. The power source 606 may be located within the main body and/or external to the main body of the flying device 600. In one implementation, the power source 606 is a 3S lithium polymer, 5 Wh battery. Advantageously, the power source 606 can be positioned such the flying devices 600 can provide increased kinetic energy storage during flight, which may result in enhanced autorotation.

The motor(s) 608 of the flying device 600 can be in communication with the controller 602. The motor(s) 608, can be used to generate motion along one or more axis of the flying device 600. Motor(s) 608 can include an actuator, a servo, a solenoid a brushless DC motor, an AC motor and/or the like. In an example implementation, at least one motor may be configured to drive a propeller, generating thrust for the flying device 600, at least one motor 608 may be configured to enable the wing to rotate about a lateral axis to increase and/or decrease a pitch angle of the wing, and at least one motor 608 may be configured to enable rotation of a motor and propeller about a longitudinal axis, such that the motor and propeller may rotate to convert the flying system between various flight modes as described herein.

The flying device 600 may be configured with one or more latching mechanism(s) 610. The latching mechanism(s) 610 may be in communication with the controller 602. The latching mechanism 610 can function the same as and/or similar to any of the latching mechanisms described herein. For example, the latching mechanism(s) 610 may be used to connect two, three, four, five, and or more flying devices.

The flying device 600 may be further configured with a payload 612. A payload 612 may be attached to the main body of the flying device 600. The payload 612 can be for example, surveillance and/or monitoring equipment (e.g., a camera, a video recorder, or the like), and/or any item for transport and/or operation for the desired mission of the flying device. In an example implementation, the payload 612 can be about 23 grams.

The flying device 600 can include one or more sensor(s) 614 in communication with the controller 602. One or more sensor(s) 614 can be one or more of, for example, a temperature sensor, a pressure sensor, a humidity sensor, an inertial sensor, a camera, a radar, a lidar detector, and/or the like. An inertial sensor can include one or more gyroscopes and/or accelerometers configured to determine inertial data of the flying device 600. Further the one or more sensor(s) 614 may be used to determine one or more characteristics of the flying device 600 and/or one or more characteristics of the environment of the flying device 600. For example, the flying device 600 may include one or more temperature sensor(s). In an example implementation a temperature sensor may be used to determine the temperature of one or more components of the flying device 600, such as a motor 608, the controller 602 and/or the payload 612 and/or any other component of the flying device 600. In an example implementation a temperature sensor may be used to determine ambient air temperature for the flying device 600.

External system(s) 620 can include one or more external devices such as a user device. A user device can be, for example, a cell phone, a remote controller, a laptop, a server, and/or the like. Additionally, external system(s) 620 can include one or more external controllers, providing instructions to the flying system autonomously, such as a server pre-loaded with flight and/or mission instructions that transmits and receives data from the flying device 600. External system(s) 620 may communicate with one or more flying devices 600 to control flight modes, and/or any other operational and/or functional characteristic of the flying device 600.

Figure 6B:
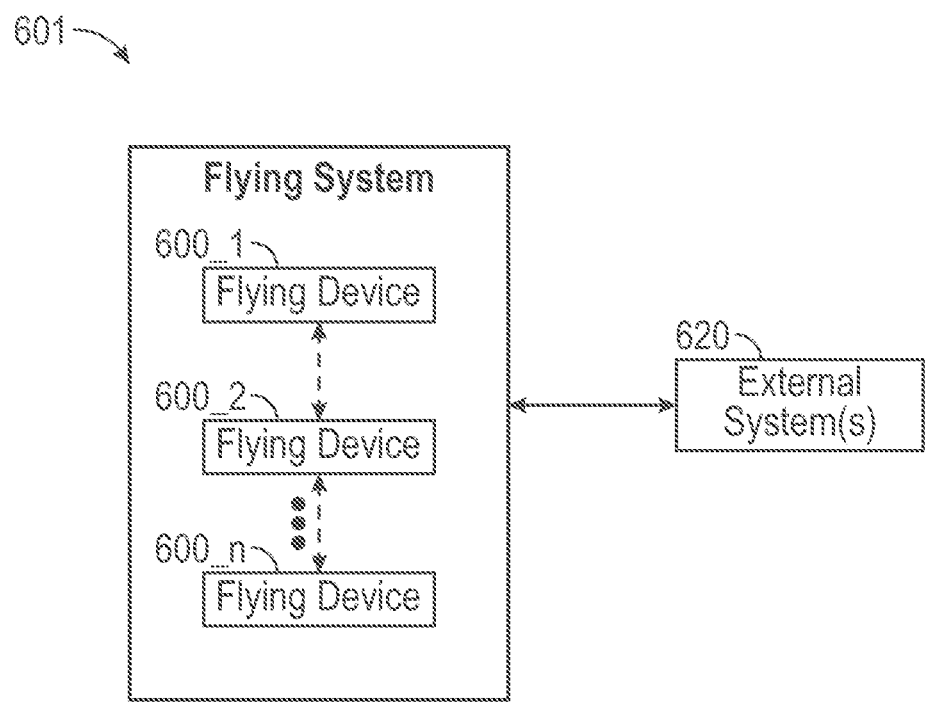
FIG. 6B is a block diagram of an example implementation of a flying system that comprises multiple of the flying devices of FIG. 6A.

FIG. 6B is a block diagram of an example flying system 601. As noted above, the flying system 601 may be controlled by one or more flying devices 600_1, 600_2, to 600_n and/or external system(s) 620. The flying system 601 may operate in one or more flight modes, such as a vertical takeoff and landing mode, a rotational mode, and/or a fixed wing mode. In one implementation, each flying device 600_1 to 600_n of flying system 601 may communicate with one or more other flying devices within the flying system

601 (for example, the flying devices 600_1 to 600_n may communicate with one another to achieve different flight modes of the flying system). Additionally, each flying device 600_1 to 600_n and/or a single flying device may communicate with external system(s) 620 as described above.

V. Example Comparison to Traditional Quadcopter Design

Figure 7B:
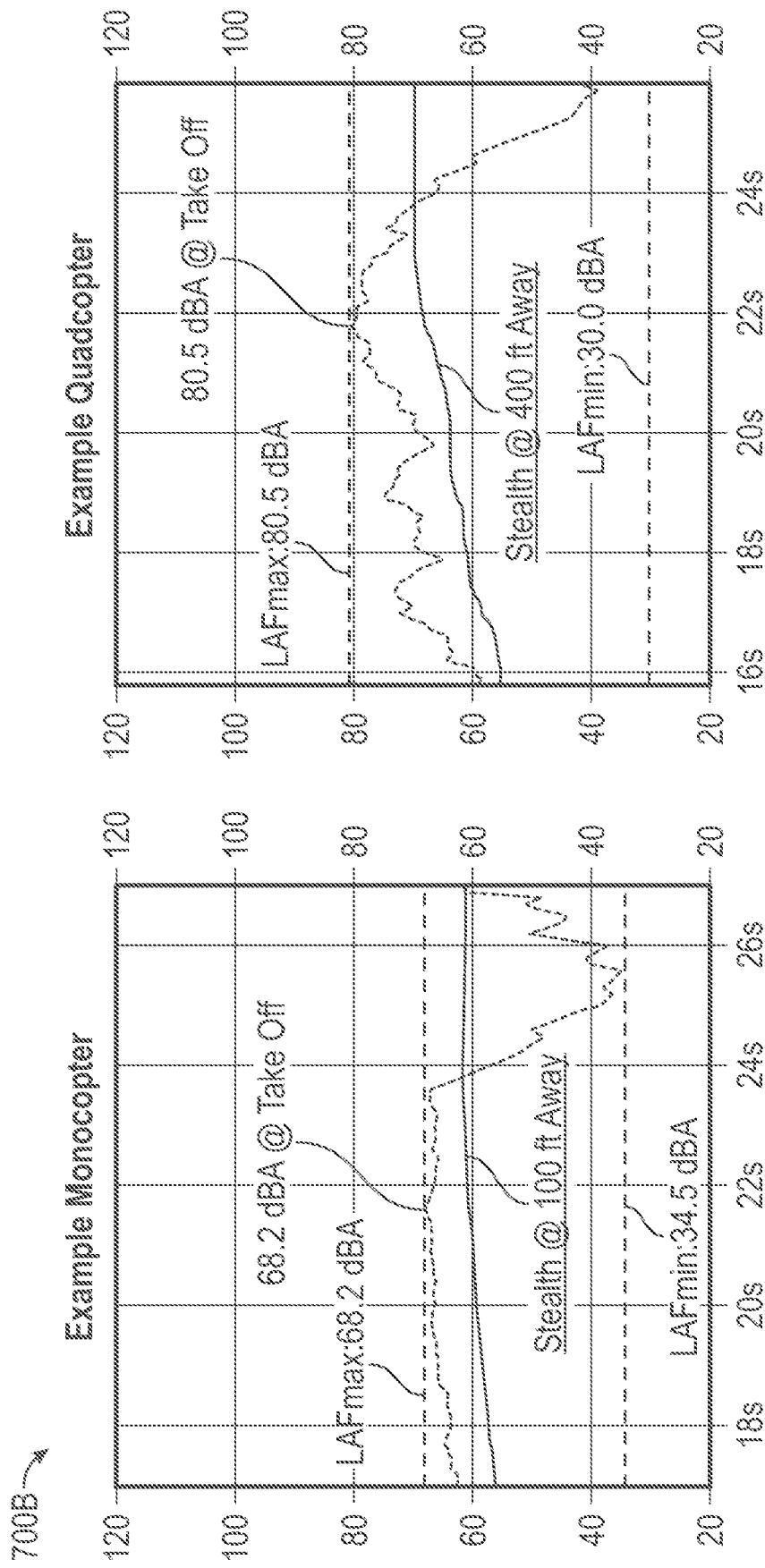

FIG. 7A-7B include example comparisons of a monocopter (i.e., a flying device as disclosed herein) and a quadcopter design. In table 700A, performance characteristics of a monocopter and quadcopter are illustrated. For example, efficiency, flight time, noise at takeoff, and/or descent on power failure characteristics are compared for a monocopter and/or a quadcopter. As gathered from the table 700A, the monocopter may be significantly lighter than an example quadcopter. A monocopter may be significantly lighter at least because a monocopter can have the ability to leverage an autorotation mode and/or a differential parachute mode (if applicable) instead of utilizing a parachute as required by an example quadcopter. Additionally, flight time of an example monocopter may be three times as long as that of an example quadcopter. Flight time may be increased for a monocopter design due in part because the power source and/or motors of the monocopter are positioned to enhance autorotation as described herein. A monocopter may be significantly quieter during takeoff due in part because, for example, only one motor may be necessary for flight of the monocopter. Additionally, descent on power failure can be much less for a monocopter due in part to the ability of the monocopter to autorotate during power failure.

FIG. 7B is a graph 700B of a noise comparison of an example monocopter and an example quadcopter. The example monocopter may produce less noise at take off, approximately 68.2 dBA versus 80.5 dBA produced by the example quadcopter. In the example graph 700B, noise produced by the monocopter during takeoff is about four times lower than the noise produced by the example quadcopter.

VI. Example Flying Device Efficiency Equations

Figure 8:
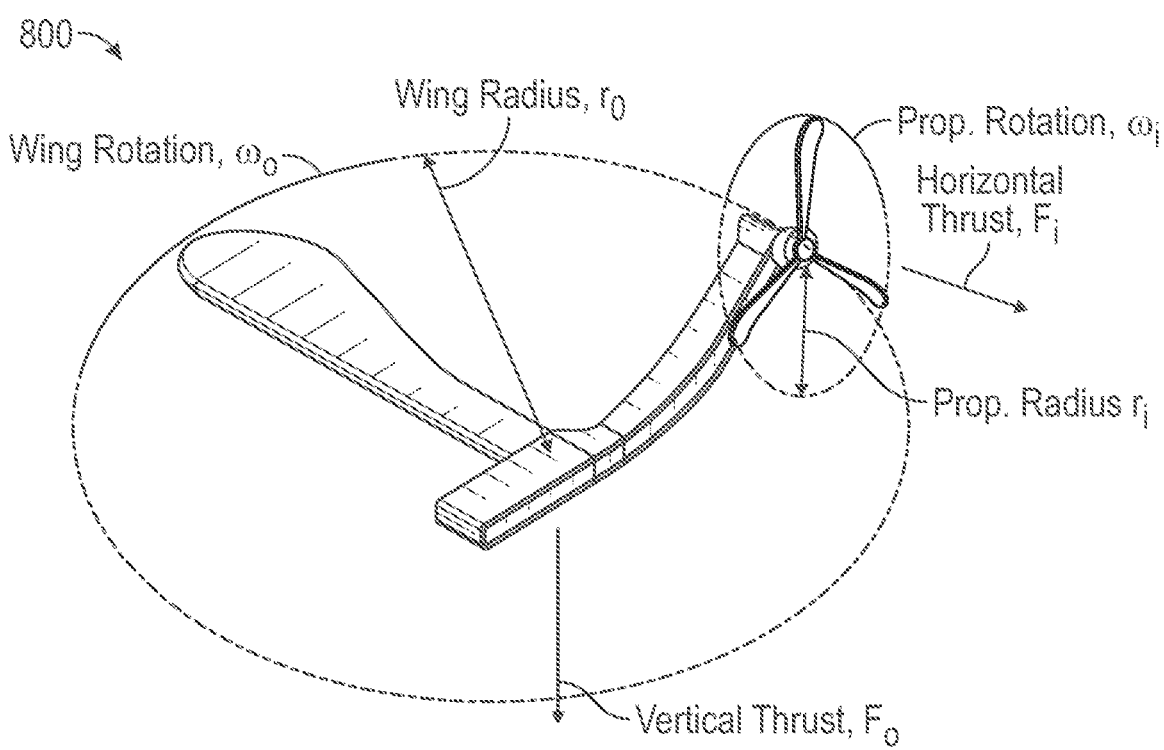
FIG. 8 illustrates the flying device of FIG. 1, with a set of assigned example parameters used to calculate a thrust augmentation.

FIG. 8 illustrates an example flying device 800 and set of assigned example parameters used to calculate a thrust augmentation design methodology. The flying device 800 is the same as or similar to the flying device 100 of FIG. 1. Thrust augmentation allows a flying device to increase total vertical thrust by leveraging one or more physical properties of the flying device (e.g., the wing radius, wing velocity, propeller radius, propeller velocity, and/or the like). Consequently, thrust augmentation allows a flying device to maintain flight while efficiently conserving energy, thus longer flight times, a lighter design, and/or a lower overall cost of manufacturability can be achieved. The following equations can be used to determine when thrust is augmented, and thus provide an efficiency estimation for the flying device. Advantageously, the flying device described herein can have a minimal amount of drag, therefore a substantial amount of power may be transferred from horizontal thrust to vertical thrust as described below:

The input power provided to the motor and propeller producing horizontal thrust can be defined as:

$$P_i \omega_i \tau_i$$

$\omega_i$=propeller anglar velocity
$\tau_i$=torque in

Torque of the motor and propeller can be defined as:

$$\tau_i = r_i F_i \eta_p \quad (1)$$

$r_i$=propeller disc radius
$F_i$=horizontal force
$\eta_p$=propeller efficiency (1) Propeller efficiency, $\eta_p$, is a parameter that accounts for losses in the conversion of the motor input power (electric, fuel or hydrogen) into a rotating force, and of the transfer of the rotating force into a linear, horizontal thrust.

Input power can then be defined as:

$$P_i = \omega_i (r_i F_i \eta_p)$$

Output power of the rotating wing of the flying device, producing vertical thrust may be defined as:

$$P_o = \omega_o \tau_o$$

$\omega_o$=monowing angular velocity
$\tau_o$=torque out

Torque for the flying device may be defined as:

$$\tau_o = r_o F_o \eta_w \quad (2)$$

$r_o$=wing disc radius
$F_o$=vertical force
$\eta_w$=wing efficiency (2) Wing efficiency, $\eta_w$, is a parameter that accounts for losses in the transfer of the wing rotating force into a linear, vertical thrust.

Output power can then be defined as:

$$P_o = \omega_o (r_o F_o \eta_w)$$

With no gear losses, such as friction, nearly all power transfers from horizontal thrust to vertical thrust can be:

$$P_i = P_o$$

$$\omega_i (r_i F_i \eta_p) = \omega_o (r_o F_o \eta_w)$$

Rearranging of the ratio of output to input thrust:

$$(F_o/F_i) = (\omega_i/\omega_o)(r_i/r_o)(\eta_p/\eta_w)$$

The following design ratios may be considered:
When $(\omega_i/\omega_o)$ is large, angular rate of the propeller is much greater than the angular rate of the wing.
When $(r_i/r_o)$ is small, radius of the propeller is less than the radius of the wing.
The $(\eta_p/\eta_w)$ propeller and wing efficiency can be similar, the ratio is about 1:1.

Thus, thrust is augmented when the ratio $(\omega_i/\omega_o)$ is much greater than the ratio $(r_i/r_o)$ and the ratio $(\eta_p/\eta_w)$ is smaller or greater than 1.

For an example implementation of a flying device having a wing length of about 23 centimeters, an example test measurement may be:

$$(\omega_i/\omega_o) = 600 \text{ Hz}/20 \text{ Hz} = 30$$

$$(r_i/r_o) = 3.2 \text{ cm}/23 \text{ cm} = 0.14$$

$$\eta_p = 1.24 \text{ grams/watt}$$

Wing efficiency was not measured, but it can be estimated to verify it is a reasonable figure:

$$\eta_p/\eta_w = 1.24/\eta_w$$

From the actual flight:

$$(F_o/F_i) = 192 \text{ grams}/90 \text{ grams} = 2.13$$

From the design ratios:

$$(F_o/F_i) = (30)(0.14)(1.24/\eta_w)$$

A wing efficiency estimated for this design is:

$$2.13=(30)(0.14)(1.24/\eta_w)$$

$$\eta_w=2.45 \text{ grams/watt}$$

And the efficiency ratio is:

$$\eta_p/\eta_w=1.24/2.45=0.5$$

and augmentation for the prototype is:

$$F_o/F_i=(\omega_i/\omega_o)(r_i/r_o)(\eta_p/\eta_w)$$

$$F_o/F_i=(30)(0.14)(0.5)=2.13$$

A redesign to change the efficiency ratio (0.5 to 1.0) yields a vertical thrust of over 4× of input thrust:

$$F_o=4.26\ F_i$$

VII. Flow Diagram for Disaggregation and Changing Flight Modes

Figure 9:
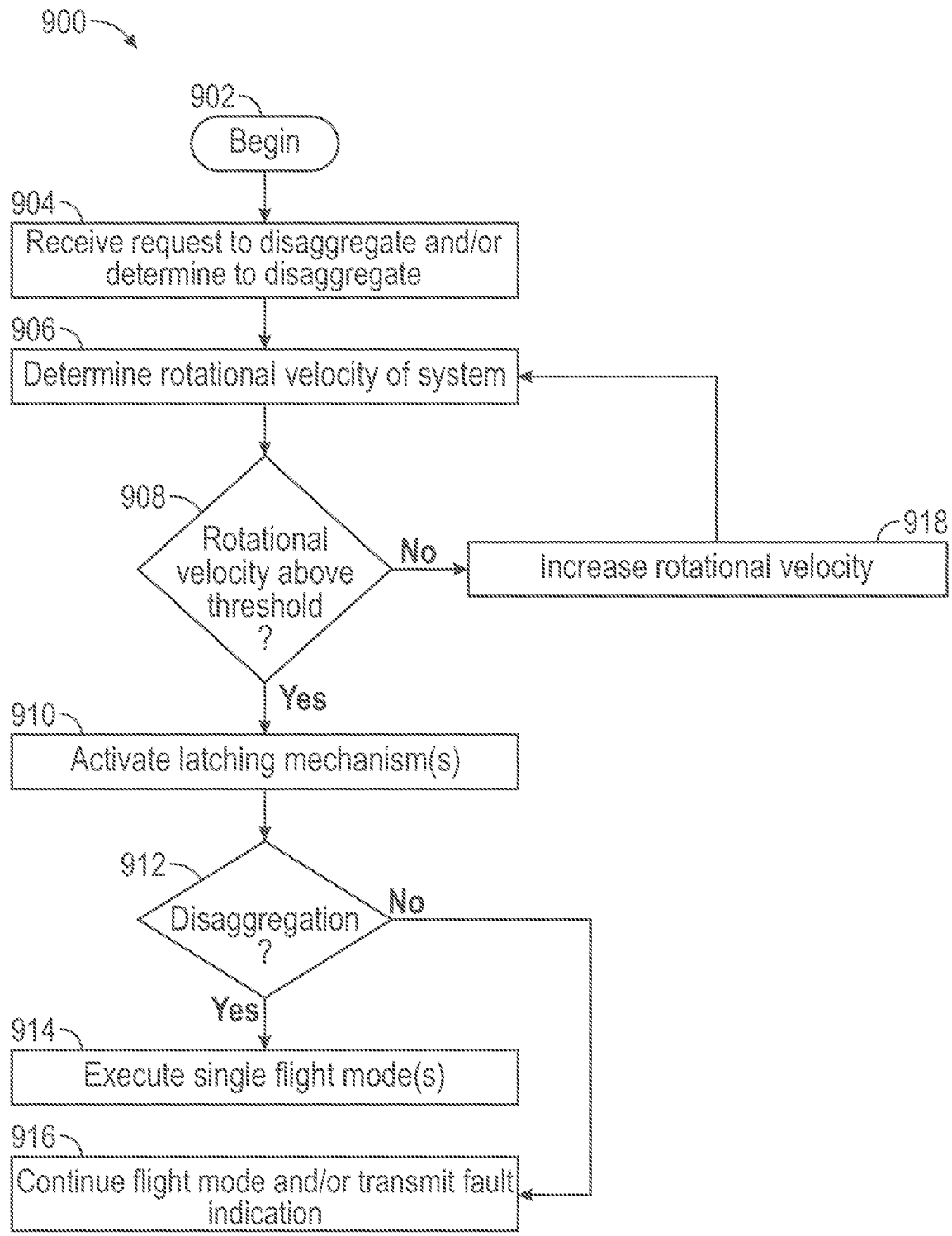
FIG. 9 is a flow diagram depicting an example method for disaggregation of a flight system.

FIG. 9 is a flow diagram 900 depicting an example disaggregation operation of a flight system. The flow diagram 900 is described with reference to flight devices 600_1 to 600_n, flying system 601, and external system(s) 620 of FIGS. 6A-6B. The same or a similar process can also be conducted by the flying system 500 of FIGS. 5A-5D. The disaggregation operation begins at block 902.

At block 904 the flying system 601 can receive a request to disaggregate and/or determine to disaggregate. The request may be received from, for example, external system(s) 620. As noted above, external system(s) 620 can include one or more external devices such as a user device. A user device can be, for example, a cell phone, a remote controller, a laptop, a server, and/or the like. Additionally, external system(s) 620 can include one or more external controllers, providing instructions to the flying system autonomously, such as a server pre-loaded with flight and/or mission instructions that transmits and receives data from the flying system 601. Additionally, the flying system 601 (i.e., via one or more controllers 602 of the flying devices 600) may determine to disaggregate. For example, a flying device 600 may operate in an autopilot mode, wherein the controller 602 operates the flying device 600 based a pre-loaded program. The autopilot mode may not require input from, for example, external system(s) 620 (e.g., a user devices as described herein).

At block 906 the flying system 601 can determine a rotational velocity of the system. As noted above, the flight system may be in a second flight mode (rotational flight mode). In an example implementation, controller 602 may receive an input from one or more sensor(s) 614 to determine the rotational velocity of the flying system 601, such as, from an inertial sensor (accelerometer, gyroscope, and/or any other sensor).

At decision node 908, the controller 602 determines whether the flying system 601 has exceeded a rotational velocity threshold. If the controller determines that the flying system has exceeded a rotational velocity, then the disaggregation operation continues to block 910. If the controller determines that the flying system has not exceeded a rotational velocity, the disaggregation operation continues to block 918, where the controller increases the rotational velocity of the flying system, before looping back to block 906. Additionally, and/or alternatively, the controller may determine another threshold parameter, such as based on a time, output to one or more motors, and/or the like.

At block 910, the controller 602 instructs the flying devices 600_1 to 600_n of the flying system 601 to activate latching mechanism(s) 610. As noted above, controller 602 may instruct one or more flying devices 600_1 to 600_n, and/or external system(s) 620 may instruct each controller 602 of flying devices 600_1 to 600_n to activate the latching mechanism(s) 610. Additionally and/or alternatively, external system(s) 620 may instruct one controller 602 to activate the latching mechanism(s) 610, and the controller 602 may instruct controllers of connected flying devices 600_1 to 600_n to activate their respective latching mechanism(s).

At block 918, the controller 602 increases the rotational velocity of the flying system 601. The rotational velocity may be increased by, for example, providing more energy to the one or more motors 608 and the propeller of each flying device 600_1 to 600_n.

At decision node 912, the controller determines whether the flying devices have disaggregated. If the controller determines that the flying devices 600_1 to 600_n have disaggregated, the disaggregation operation proceeds to block 914. If the operation determines that the flying devices 600_1 to 600_n have not disaggregated, the disaggregation operation proceeds to block 916.

At block 914, each flying device 600_1 to 600_n of the flying system 601 is disaggregated and executes a single flight mode. As noted above, flying devices 600_1 to 600_n may enter one or more of an autorotational flight mode, a hover, a differential parachute flight mode, a freefall, and/or the like.

At block 916, the one or more controllers 602 may continue with an existing flight mode and/or transmit a fault indication. The controller 602 may determine that the flying system 601 has not disaggregated. A controller 602 may transmit to, for example, another controller 602, and/or external system(s) 620 that a fault has been detected. Additionally and/or alternatively, the flying system 601 may continue to operate in one or more flight modes after a failed attempt to disaggregate. In an example implementation, after determining that a disaggregation attempt has failed, the flying system 601 can determine a safe location and land the flying system 601.

Figure 10:
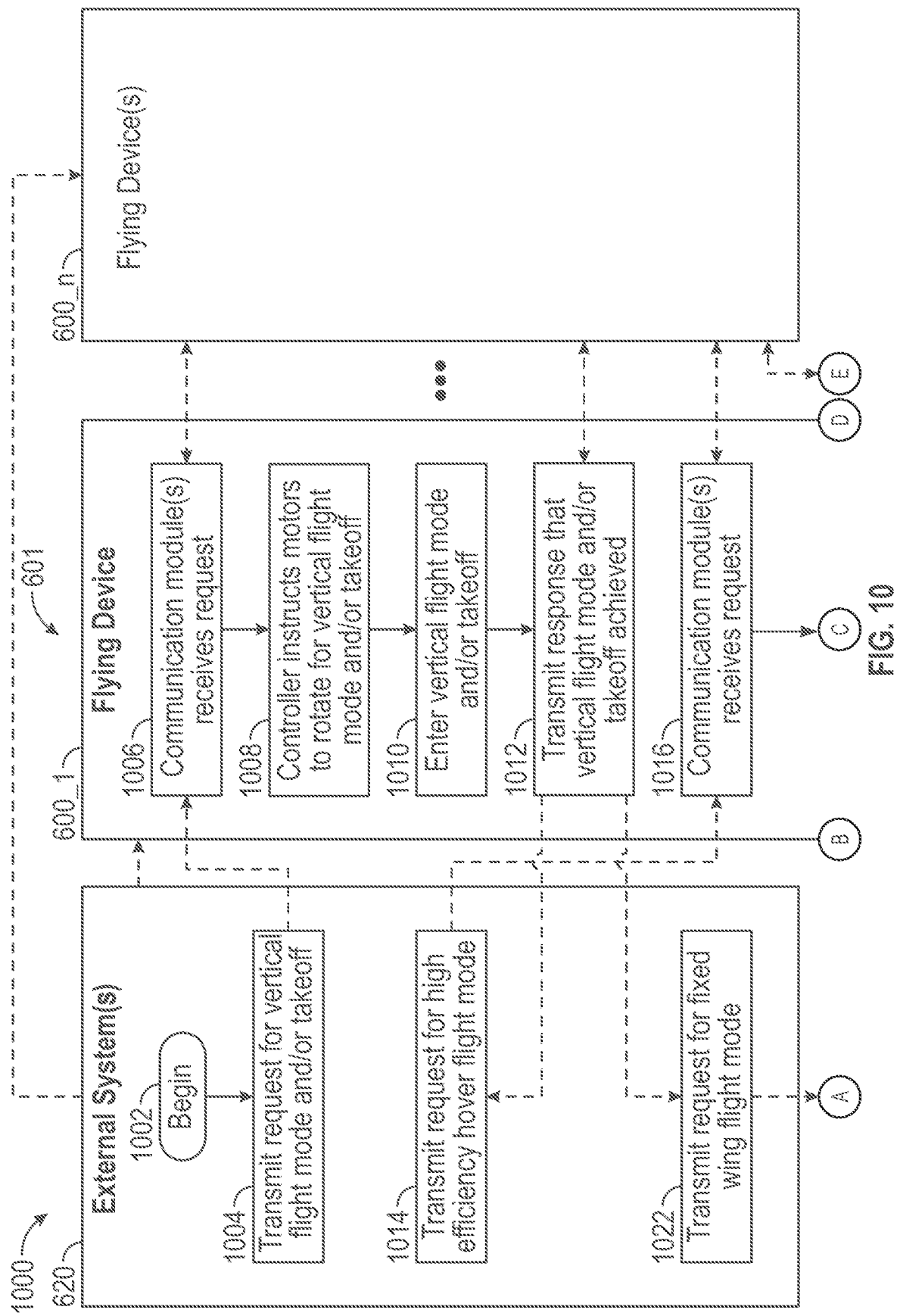
FIG. 10 is a flow diagram depicting example communication between one or more flying devices and an external system while operating a flying system in various flight modes.
Figure 10:
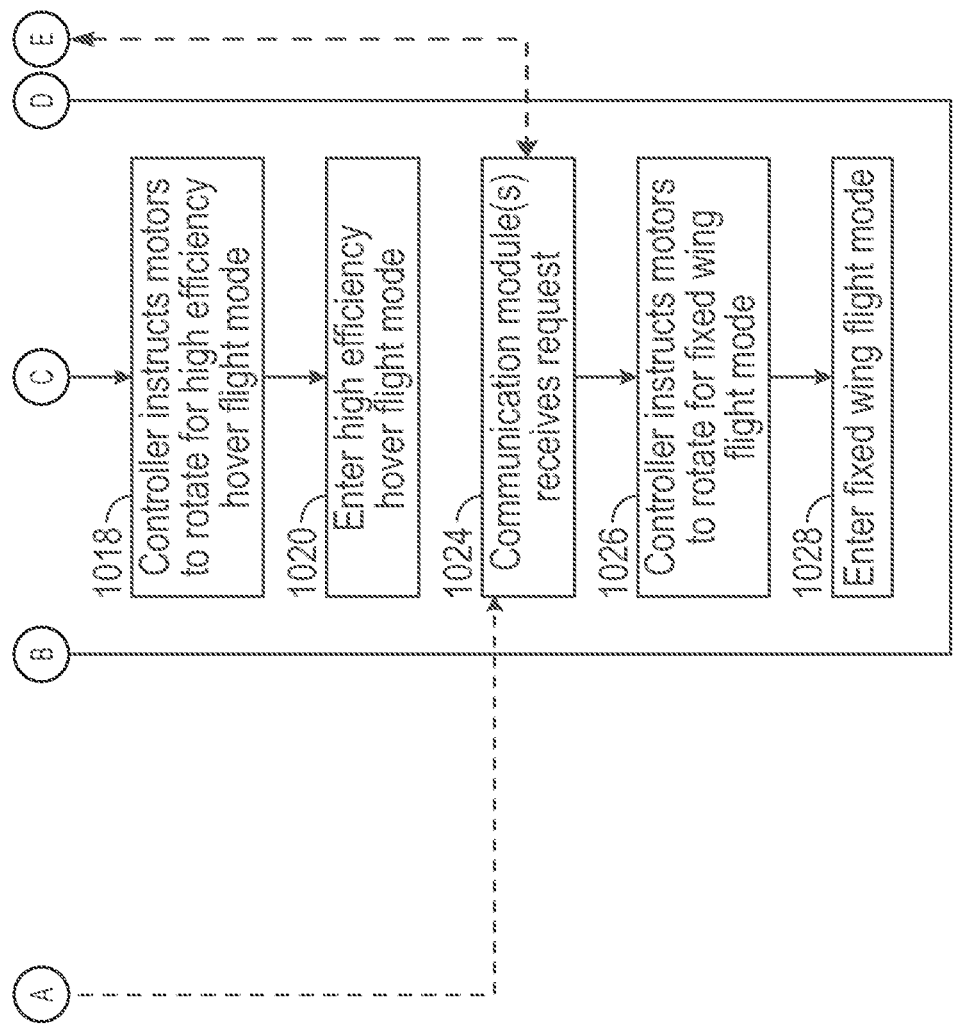

FIG. 10 is a flow diagram 1000 depicting the communication between one or more flying devices and an external system while operating a flying system in various flight modes. The flow diagram 1000 is described with reference to flying devices 600_1 to 600_n, external system(s) 620, flying system 601, and/or the components thereof, as illustrated in FIGS. 6A-6B. The same or a similar process can also be conducted by the flying system 500 of FIGS. 5A-5D. The flow diagram 1000 illustrates (a) a number of communications between the box representing external system(s) 620 and the box representing flying device 600_1, and (b) a number of communications between the box representing flying device 600_1 and the box representing flying device(s) 600_n. The techniques disclosed herein are not, however, limited to an external system communicating with a single flying device of a flying system, and that single flying device communicating with the other flying devices of the flying system. For example, in various implementations, any of the communications described herein may occur directly between the external system(s) and one, more than one, or all of the flying devices of the flying system. For instance, the external system 620 may communicate with each of one or more flying devices 600_n in the same manner as shown and described with respect to communication with the flying device 600_1.

The flow diagram begins at block 1002. At block 1004, external system(s) 620 can transmit a request that the flying system 601 enter a vertical flight mode and/or takeoff. At block 1006, the communication module 604 of flying device 600_1 may receive the request transmitted by external system(s) 620. The communication module 604 of flying device 600_1 may transmit the received request to additional flying devices 600_n of the flying system 601. In an additional implementation, external system(s) 620 transmits one or more requests for vertical flight mode and/or takeoff, and/or any other flight mode described herein. The request is transmitted to each individual flying device 600_1 to 600_n of flying system 601.

The flying devices 600_1 to 600_n may perform the following steps of blocks 1008 to 1010 synchronously, and/or asynchronously. At block 1008, the controller 602 of flying device 600_1 instructs the motors to rotate for vertical flight mode and/or takeoff. Vertical flight mode and/or takeoff can be the same and/or similar to a first flight mode as noted above. At block 1010, the controller 602, as well as additional controllers of flying devices 600_n, operate the flying device 600_1 to 600_n, such that the flying system 601 enters a vertical flight mode and/or takeoff. At block 1012 the controller 602, as well as additional controllers of flying devices 600_n may transmit a response to external system(s) 620 that a vertical flight mode and/or takeoff has been achieved.

At block 1014, external system(s) 620 may transmit a request to enter a high efficiency hover flight mode based on a response received from the flying system 601 that a vertical flight mode and/or takeoff is achieved. At block 1016, the communication module 604 of flying device 600_1 may receive the request transmitted by external system(s) 620. The communication module 604 of device 600_1 may transmit the received request to additional flying devices 600_n of the flying system 601. The flying devices 600_1 to 600_n may perform the following steps of blocks 1018 to 1020 synchronously, and/or asynchronously. At block 1018, the controller 602 of flying device 600_1 instructs the motors to rotate for a high efficiency hover. High efficiency hover flight mode can be, for example the same and/or similar to a second flight mode as noted above. At block 1020, the controller 602, as well as additional controllers of flying devices 600_n, operate the flying device 600_1 to 600_n, such that the flying system 601 enters a high efficiency hover flight mode. Optionally, the controller 602, as well as additional controllers of flying devices 600_n may transmit a response to external system(s) 620 that a high efficiency hover flight mode is achieved.

At block 1022, external system(s) 620 may transmit a request to enter a fixed wing flight mode based on a response received from the flying system 601 that a vertical flight mode and/or takeoff is achieved. At block 1024, the communication module 604 of flying device 600_1 may receive the request transmitted by external system(s) 620. The communication module 604 of device 600_1 may transmit the received request to additional flying devices 600_n of the flying system 601. The flying devices 600_1 to 600_n may perform the following steps of blocks 1026 to 1028 synchronously, and/or asynchronously. At block 1026, the controller 602 of flying device 600_1 instructs the motors to rotate for fixed wing flight. A fixed wing flight mode can be, for example the same and/or similar to a third flight mode as noted above. At block 1028, the controller 602, as well as additional controllers of flying devices 600_n, operate the flying device 600_1 to 600_n, such that the flying system 601 enters a fixed wing flight mode. Optionally, the controller 602, may transmit a response to external system(s) 620 that a fixed wing flight mode is achieved.

Figure 11:
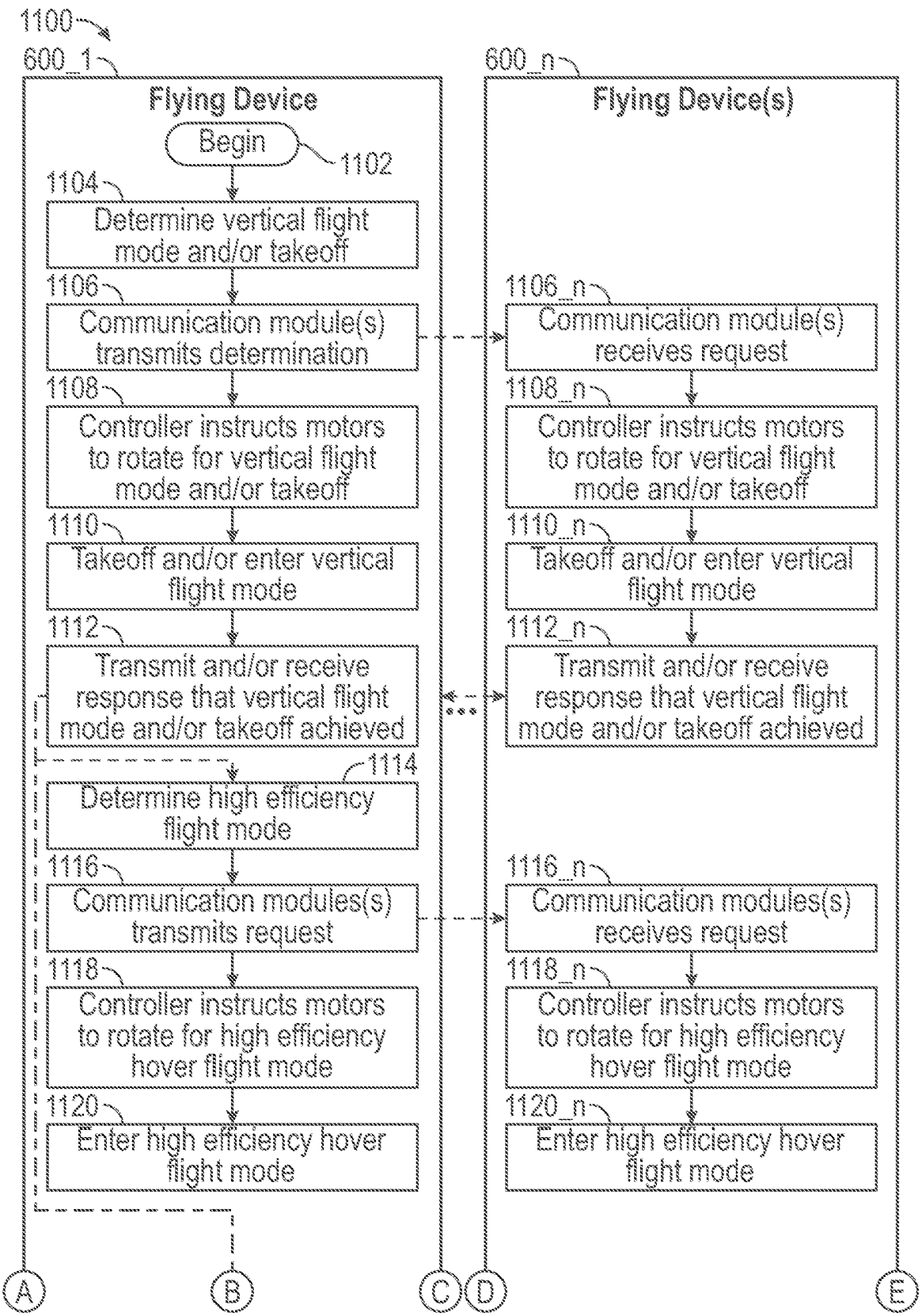
FIG. 11 is another flow diagram depicting example communication between one or more flying devices of a flying system while operating the flying system in various flight modes.
Figure 11:
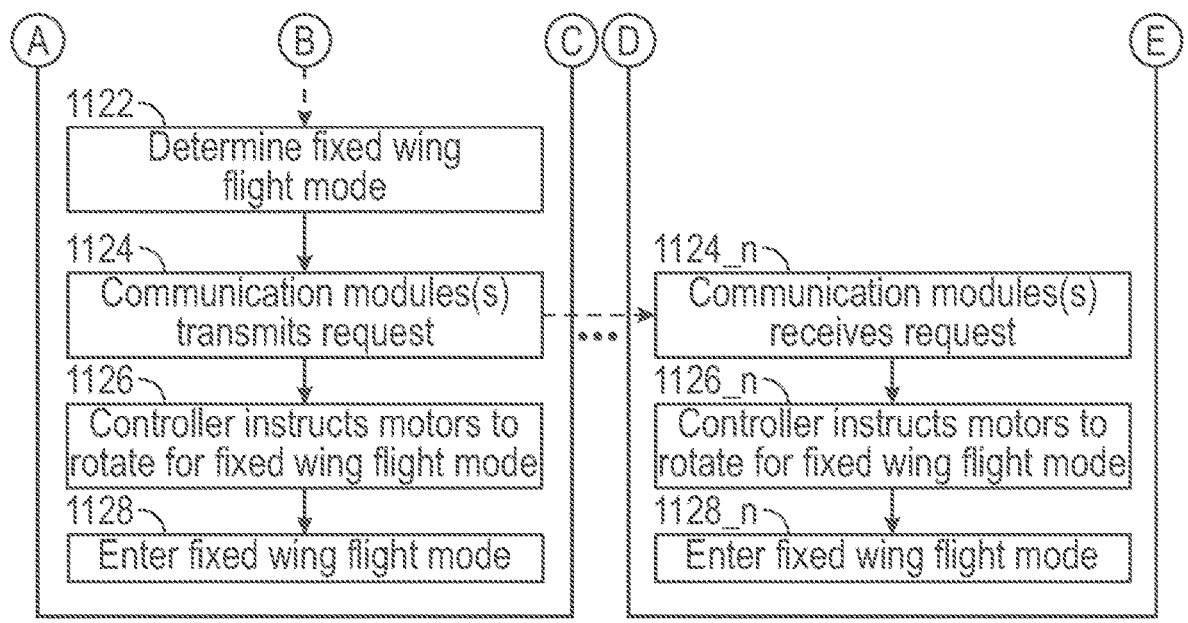

FIG. 11 is a flow diagram 1100 depicting the communication between one or more flying devices of a flying system while operating the flying system in various flight modes. The flow diagram 1100 is described with reference to flying devices 600_1 to 600_n, flying system 601, and/or the components thereof, as illustrated in FIGS. 6A-6B. The same or a similar process can also be conducted by the flying system 500 of FIGS. 5A-5D. The flow diagram begins at block 1102.

At block 1104, the flying device 600_1 can determine a vertical flight mode and/or takeoff. As noted above, controller 602 may determine one or more flight modes of the flying system 601. The controller 602 may include computer readable memory, storing one or more flight programs governing one or more operations of the flying device. For example, the flying system 601 may operate in an autopilot mode, wherein the controller 602 operates the one or more flying devices 600_1 to 600_n of the flying system 601 based on a pre-configured program. The autopilot mode may not require input from for example, an external source (e.g., a user devices as described herein). The vertical flight mode and/or takeoff can be the same as and/or similar to a first flight mode as described herein.

At block 1106, the communication module(s) 604 transmits the determined vertical flight mode and/or takeoff instructions to additional flying devices 600_n of the flying system 601. As noted above, the communication module(s) 604 (and/or the controller 602) can enable the flying device 600_1 to communicate with one or more additional flying devices 600_n. Additionally, at block 1106_n the communication modules of flying devices 600_n may receive the determined flight mode from communication module(s) 604 of flying device 600_1. In an example implementation, communication module 604 (and/or controller 602) of flying device 600_1 communicates to all flying devices 600_1 to 600_n of the flying system 601. In an example implementation, communication module 604 (and/or controller 602) of flying device 600 communicates serially, to a next flying device (e.g., flying device 600_n). The next flying device 600_n may communicate to a further flying device (e.g., 600_n+1).

The flying devices 600_1 to 600_n may perform the following steps of blocks 1108, 1108_n, 1110, 1110_n, 1112, and/or 1112_n synchronously, and/or asynchronously. At block 1108, the controller 602 of flying device 600_1 instructs the motors to rotate for vertical flight mode and/or takeoff. Vertical flight mode and/or takeoff can be the same and/or similar to a first flight mode as noted above. At block 1110, the controller 602 operates the flying device 600_1, to enter a vertical flight mode and/or takeoff. At block 1112 the controller 602, as well as additional controllers of flying devices 600_n may transmit a response to one or more flying devices 600_1 to 600_n of the flying system 601, that a vertical flight mode and/or takeoff has been achieved.

At block 1114, controller 602 may determine that flying system 601 will enter a high efficiency hover flight mode. As noted above, the flying system 601 may operate in an autopilot mode, wherein controller 602 operates the one or more flying devices 600_1 to 600_n based on a pre-configured program.

At block 1116, the communication module(s) 604 transmits the determined high efficiency hover flight mode instruction to additional flying devices 600_n of the flying system 601. As noted above, the communication module(s) 604 (and/or the controller 602) can enable the flying device 600_1 to communicate with one or more additional flying devices 600_n. Additionally, at block 1116_n the communication module of flying devices 600_n may receive the determined flight mode from communication module(s) 604 of flying device 600_1. In an example implementation, communication module 604 (and/or controller 602) of flying device 600_1 communicates to all flying devices 600_1 to 600_n of the flying system 601. In an example implementation, communication module 604 (and/or controller 602) of flying device 600 communicates serially to a next flying device (e.g., flying device 600_n). The next flying device 600_n may communicate to a further flying device (e.g., 600_n+1) and so on.

The flying devices 600_1 to 600_n may perform the following steps of blocks 1118, 1118_n, 1120, and/or 1120_n synchronously, and/or asynchronously. At block 1118, the controller 602 of flying device 600_1 instructs the motors to rotate for a high efficiency hover flight mode. High efficiency hover flight mode can be the same and/or similar to a second flight mode as noted above. At block 1120, the controller 602 operates the flying device 600_1, to enter a high efficiency hover flight mode. Optionally, controller 602, as well as additional controllers of flying devices 600_n may transmit a response to one or more flying devices 600_1 to 600_n of the flying system 601, that the high efficiency hover flight mode has been achieved.

At block 1122, controller 602 may determine that flying system 601 will enter a fixed wing flight mode. As noted above, the flying system 601 may operate in an autopilot mode, wherein controller 602 operates the one or more flying devices 600_1 to 600_n based on a pre-configured program.

At block 1124, the communication module(s) 604 transmits the determined fixed wing flight mode instruction to additional flying devices 600_n of the flying system 601. As noted above, the communication module(s) 604 (and/or the controller 602) can enable the flying device 600_1 to communicate with one or more additional flying devices 600_n. Additionally, at block 1124_n the communication module of flying devices 600_n may receive the determined flight mode from communication module(s) 604 of flying device 600_1. In an example implementation, communication module 604 (and/or controller 602) of flying device 600_1 communicates to all flying devices 600_1 to 600_n of the flying system 601. In an example implementation, communication module 604 (and/or controller 602) of flying device 600 communicates serially to a next flying device (e.g., flying device 600_n). The next flying device may communicate to a further flying device (e.g., 600_n+1) and so on.

The flying devices 600_1 to 600_n may perform the following steps of blocks 1126, 1126_n, 1128, and/or 1128_n synchronously, and/or asynchronously. At block 1126, the controller 602 of flying device 600_1 instructs the motors to rotate for a fixed wing flight mode. Fixed wing flight mode can be the same and/or similar to a third flight mode as noted above. At block 1128, the controller 602 operates the flying device 600_1, to enter a fixed wing flight mode. Optionally, controller 602, as well as additional controllers of flying devices 600_n may transmit a response to one or more flying devices 600_1 to 600_n of the flying system 601, that the fixed wing flight mode has been achieved.

VIII. Other Remarks

One of ordinary skill the art will appreciate that flying devices can have various configurations with different shapes and sizes. The figures show example flying devices, but example embodiments can be utilized with both commercial and recreational flying devices of different sizes and shapes.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the disclosures or claims.

In some embodiments, at least some of the techniques disclosed herein related to wireless control of a flying device and/or dynamic configurability of a controller are technically impossible to perform by a human being and/or require the use of a computing device. For example, to enable a reasonable level of controllability of the flying device, it can be desirable to reduce lag time or latency between movement of user inputs on the controller and corresponding flight control adjustments made by the flying device. It can be desirable for these adjustments to occur in real time or substantially in real time, such as, for example, with a lag time or latency of no greater than 1, 5, 10, 20, 50, or 100 milliseconds. Further, if a user wishes to switch the present control mode of the controller while the flying device is in flight, it can be desirable to minimize the amount of time it takes to switch modes, so that, for example, the flying device does not crash or otherwise operate undesirably while the mode switch is being made. This dynamic switch of modes can desirably occur in real time or substantially in real time, such as, for example, with a lag time or latency of no greater than 1, 5, 10, 20, 50, or 100 milliseconds.

Any ranges disclosed herein also encompass any and all overlap, sub-ranges, and combinations thereof. Language such as "up to," "at least," "greater than," "less than," "between," and the like includes the number recited. Numbers preceded by a term such as "approximately," "about," and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Although the features that have been disclosed in the context of certain preferred embodiments and examples, it will be understood by those skilled in the art that the present disclosure extends beyond the specifically disclosed embodiments to other alternative embodiments and/or uses of the disclosure and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially.

Thus, it is intended that the scope of the present disclosure herein disclosed should not be limited by the particular disclosed embodiments described above.

What is claimed is:

1. An unmanned flying device comprising:
   a main body;
   a wing pivotally coupled to the main body;
   a wing actuator operably coupled to the wing and configured to pivot the wing about a first axis;
   a propulsion unit pivotally coupled to the main body;
   a propulsion unit actuator operably coupled to the propulsion unit and configured to pivot the propulsion unit about a second axis;
   a latching unit attached to the main body and configured to connect the main body of the flying device with one or more other flying devices;
   a control system comprising one or more processors configured to control operation of the wing actuator, the propulsion unit, and the propulsion unit actuator;
   a communication system configured to communicate wirelessly with one or more external systems, transmit data to the control system, and receive data from the control system; and
   a power source configured to provide power to the wing actuator, the propulsion unit, the propulsion unit actuator, the control system, and the communication system,
   wherein the first axis and the second axis are positioned such that, with the wing in a first configuration and the propulsion unit in a first configuration, thrust generated by the propulsion unit can rotate the unmanned flying device in a manner that causes the wing to generate lift.

2. The unmanned flying device of claim 1, wherein the second axis is orthogonal to the first axis.

3. The flying device of claim 1, wherein the latching unit comprises an electro-mechanical latching mechanism comprising:
   a latch solenoid in communication with the controller, wherein the controller engages the latch solenoid to maintain or release connection between two or more flying devices.

4. The flying device of claim 1, wherein the latching unit comprises an electro-magnetic latching mechanism comprising:
   an electro-magnet in communication with the controller, wherein the controller engages the electro-magnet to maintain connection between two or more flying devices.

5. The flying device of claim 1, wherein the controller is further configured to control the propulsion unit actuator, the wing actuator, and the propulsion unit to enter one or more flight modes.

6. The flying device of claim 5, wherein the one or more flight modes includes a hovering flight mode, a translation flight mode, an autorotation descent mode, and/or a freefall mode.

7. The flying device of claim 1 further comprising a payload unit attached to the main body, wherein the payload unit is configured to provide a means to transport one or more objects by the flying device.

8. The flying device of claim 1 further comprising a motion sensor connected to the main body and configured to provide inertial data to the controller.

9. A flying system comprising:
   a plurality of flying devices, each flying device comprising:
      a main body;
      a wing pivotally coupled to the main body;
      a wing actuator operably coupled to the wing and configured to pivot the wing about a first axis;
      a propulsion unit pivotally coupled to the main body;
      a propulsion unit actuator operably coupled to the propulsion unit and configured to pivot the propulsion unit about a second axis;
      a control system comprising one or more processors configured to control operation of the wing actuator, the propulsion unit, and the propulsion unit actuator;
      a latching unit attached to the main body and configured to connect the main body of the flying device with one or more of the other flying devices;
      a communication system configured to communicate wirelessly with one or more external systems, transmit data to the control system, and receive data from the control system; and
      a power source configured to provide power to the wing actuator, the propulsion unit, the propulsion unit actuator, the control system, and the communication system,
      wherein the first axis and the second axis are positioned such that, with the wing in a first configuration and the propulsion unit in a first configuration, thrust generated by the propulsion unit can rotate the flying system in a manner that causes the wing to generate lift; and
   wherein each latching unit of each flying device is connected with an other flying device to maintain a multi-copter configuration during flight.

10. The flying system of claim 9, wherein each controller of each flying device is further configured to control its respective propulsion unit actuator, wing actuator, and motor such that the flying system achieves a fixed-wing flight mode, which comprises one or more of the wings being in a first orientation and one or more of the wings being in a second orientation.

11. The flying system of claim 9, wherein each controller of each flying device is further configured to control its respective propulsion unit actuator, wing actuator, and motor such that the flying system achieves a vertical takeoff and landing flight mode, which comprises each of the wings being in a generally vertical orientation.

12. The flying system of claim 9, wherein each controller of each flying device is further configured to control its respective propulsion unit actuator, wing actuator, and motor such that the flying system achieves a rotational flight mode, which comprises each of the wings being oriented at a pitch that can generate upward thrust.

13. The flying system of claim 9, wherein the plurality of flying devices comprises four flying devices.

14. The flying system of claim 9, wherein each controller of each flying device is further configured to operate its latching unit to cause the flying devices to detach from one another during flight.

15. A method of operating a plurality of flying devices connected together to form a multi-copter, the method comprising:
   engaging a plurality of latching mechanisms to connect the plurality of flying devices into a multi-copter flying system;
   receiving a first instruction to enter a first flight mode;
   based on the received first instruction, orienting a wing of each flying device vertically, such that a leading or trailing edge of the wing is facing upward;
   orienting a propulsion unit of each flying device such that each propulsion unit will produce thrust in a direction that will cause upward flight;

receiving a second instruction to enter a second flight mode, the second flight mode being a rotational flight mode;

based on the received second instruction, orienting the propulsion unit of each flying device such that the propulsion unit will produce thrust in a rotational direction about a vertical axis; and orienting the wing of each flying device such that the wings generate lift as the plurality of flying devices rotate about the vertical axis.

16. The method of claim 15 further comprising:

receiving a third instruction to disaggregate the plurality of flying devices; and disengaging the plurality of latching mechanism to disaggregate the plurality of flying devices.

17. The method of claim 16 further comprising based on the disaggregation of the plurality of flying devices, entering a rotational flight mode with each flying device of the plurality of flying devices.

18. The method of claim 15, further comprising:

receiving a third instruction to enter a third flight mode, the third flight mode being a fixed wing flight mode;

based on the received third instruction, orienting at least two propulsion units of the plurality of flying devices such that the at least two propulsion units of the plurality of flying devices produce thrust toward a horizontal direction; and orienting at least two wings of the plurality of flying devices such that the at least two wings generate lift as the plurality of flying devices move in the horizontal direction.

* * * * *